United States Patent
Flaig et al.

(10) Patent No.: US 12,226,729 B2
(45) Date of Patent: Feb. 18, 2025

(54) SYSTEMS AND METHODS FOR REMOVING CARBON DIOXIDE FROM A FLUID

(71) Applicant: Noya, Inc., San Francisco, CA (US)

(72) Inventors: Robinson Wiessinger Flaig, San Francisco, CA (US); Elizabeth Tu, San Francisco, CA (US); Maarten Johan Thomas-Bosum, San Francisco, CA (US); Joshua Ivan Santos-Heard, Los Angeles, CA (US); Daniel Cavero Rodriguez, San Francisco, CA (US); Nathaniel Balin Gertzman, San Francisco, CA (US); Laurene Petitjean, San Francisco, CA (US); Aditi Dhadwaiwale, San Francisco, CA (US); Brandon John Garczynski, San Francisco, CA (US)

(73) Assignee: Noya, Inc., San Francisco, CA (US)

( * ) Notice: Subject to any disclaimer, the term of this patent is extended or adjusted under 35 U.S.C. 154(b) by 0 days.

(21) Appl. No.: 18/830,374

(22) Filed: Sep. 10, 2024

(65) Prior Publication Data
US 2024/0424440 A1    Dec. 26, 2024

Related U.S. Application Data

(63) Continuation of application No. PCT/US2023/070724, filed on Jul. 21, 2023.
(Continued)

(51) Int. Cl.
*B01D 53/04* (2006.01)
*B01D 53/62* (2006.01)

(52) U.S. Cl.
CPC .... *B01D 53/0438* (2013.01); *B01D 2257/504* (2013.01); *B01D 2259/40096* (2013.01)

(58) Field of Classification Search
CPC ............... B01D 53/04; B01D 53/0438; B01D 53/0407; B01D 53/0462; B01D 2257/504; B01D 2259/40096
(Continued)

(56) References Cited

U.S. PATENT DOCUMENTS

| 5,505,825 | A | * | 4/1996 | Gold | .................... B01J 20/3416 95/143 |
| 5,628,819 | A | | 5/1997 | Mestemaker et al. | |

(Continued)

FOREIGN PATENT DOCUMENTS

| EP | 2567751 A1 | 3/2013 |
| EP | 2782657 B1 | 12/2016 |

(Continued)

OTHER PUBLICATIONS

International Preliminary Report on Patentability directed to International Patent Application No. PCT/US2022/038942, issued Jan. 18, 2024; 7 pages.
(Continued)

*Primary Examiner* — Frank M Lawrence, Jr.
(74) *Attorney, Agent, or Firm* — Sterne, Kessler, Goldstein & Fox P.L.L.C.

(57) ABSTRACT

Some embodiments are directed to a system for extracting carbon dioxide from a fluid. The system can include a fluid source and a reactor. The reactor can include one or more chambers, and each chamber can include one or more monoliths for adsorbing carbon dioxide from the fluid. The chambers can be alternatively unsealed for a contacting mode and sealed for a regeneration mode. A power source can provide an electric current to the monoliths to release carbon dioxide adsorbed by the monoliths. Each chamber can include an array of monoliths. Each monolith can include a sorbent that adsorbs carbon dioxide from fluid. The
(Continued)

system can include modular components such that the number of reactors can be increased or decreased.

30 Claims, 29 Drawing Sheets

Related U.S. Application Data

(60) Provisional application No. 63/480,463, filed on Jan. 18, 2023, provisional application No. 63/369,141, filed on Jul. 22, 2022.

(58) Field of Classification Search
USPC .............. 96/109–112, 121, 130, 143; 95/139; 423/220, 230
See application file for complete search history.

(56) References Cited

U.S. PATENT DOCUMENTS

| | | | |
|---|---|---|---|
| 5,876,488 A | 3/1999 | Birbara et al. | |
| 6,814,781 B2 | 11/2004 | Tonkovich et al. | |
| 6,824,592 B2 | 11/2004 | Monzyk et al. | |
| 7,141,092 B1 | 11/2006 | Roychoudhury et al. | |
| 7,201,841 B2 | 4/2007 | Hughes | |
| 7,655,069 B2 | 2/2010 | Wright et al. | |
| 7,795,175 B2 | 9/2010 | Olah et al. | |
| 8,043,414 B2 * | 10/2011 | Jeng | B01D 53/06 422/186.04 |
| 8,163,066 B2 | 4/2012 | Eisenberger | |
| 8,221,532 B2 | 7/2012 | Carruthers et al. | |
| 8,615,812 B2 | 12/2013 | Wójtowicz et al. | |
| 10,232,305 B2 * | 3/2019 | Gebald | F16K 1/24 |
| 11,266,951 B1 | 3/2022 | Stark et al. | |
| 11,766,636 B1 * | 9/2023 | Besarati | B01D 53/0462 95/90 |
| 2007/0056954 A1 | 3/2007 | Tennison et al. | |
| 2008/0031801 A1 | 2/2008 | Lackner et al. | |
| 2008/0138265 A1 | 6/2008 | Lackner et al. | |
| 2009/0229461 A1 * | 9/2009 | Jeng | F24F 3/1423 62/271 |
| 2010/0205856 A1 | 8/2010 | Kubic et al. | |
| 2010/0212495 A1 * | 8/2010 | Gadkaree | B01J 20/3441 502/437 |
| 2012/0003722 A1 | 1/2012 | Polak et al. | |
| 2012/0160038 A1 | 6/2012 | Wells et al. | |
| 2014/0013942 A1 | 1/2014 | Wójtowicz et al. | |
| 2015/0298049 A1 | 10/2015 | Eisenberger | |
| 2016/0288043 A1 | 10/2016 | Meirav et al. | |
| 2017/0113184 A1 | 4/2017 | Eisenberger | |
| 2018/0169568 A1 | 6/2018 | Eisenberger | |
| 2019/0209962 A1 | 7/2019 | Meirav et al. | |
| 2019/0336909 A1 | 11/2019 | Keith et al. | |
| 2021/0101105 A1 | 4/2021 | Canino | |
| 2021/0262320 A1 * | 8/2021 | Nguyen | B01D 53/62 |
| 2021/0349065 A1 | 11/2021 | Masoudi et al. | |
| 2022/0134307 A1 | 5/2022 | Sadiq et al. | |
| 2022/0387930 A1 * | 12/2022 | Iijima | B01D 53/04 |
| 2023/0036635 A1 | 2/2023 | Santos-Heard et al. | |
| 2023/0398489 A1 * | 12/2023 | Ito | B01D 53/326 |
| 2023/0405511 A1 * | 12/2023 | Santos-Head | B01J 20/20 |
| 2023/0415089 A1 * | 12/2023 | Janett | B01D 53/0438 |
| 2024/0139705 A1 * | 5/2024 | Gupta | B01D 53/82 |

FOREIGN PATENT DOCUMENTS

| | | |
|---|---|---|
| WO | WO-9818540 A1 | 5/1998 |
| WO | WO-2009115317 A1 | 9/2009 |
| WO | WO-2010107974 A1 | 9/2010 |
| WO | WO-2017017102 A1 | 2/2017 |

OTHER PUBLICATIONS

International Search Report and Written Opinion of the International Searching Authority directed to International Application No. PCT/US2022/038942, mailed Dec. 7, 2022; 11 pages.

International Search Report directed to International Patent Application No. PCT/US2023/070724, mailed Jan. 30, 2024; 4 pages.

Lee, T.S., et al., "Carbon Dioxide Removal Using Carbon Monolith as Electric Swing Adsorption to Improve Indoor Air Quality," Building and Environment, 92:209-221 (Oct. 2015).

Roychoudhury, S., et al., "Resistively-Heated Microlith-based Adsorber for Carbon Dioxide and Trace Contaminant Removal", National Aeronautics and Space Administration, SAE International, Paper Offer #05ICES-470, 8 pages (2005).

Zhao, Q., et al., "Impact of Operating Parameters on $CO_2$ Capture Using Carbon Monolith By Electrical Swing Adsorption Technology (ESA)," Chemical Engineering Journal, 327;441-453 (Nov. 2017).

International search Report and Written Opinion of the International Searching Authority directed to International Patent Application No. PCT/US2023/070724, mailed Jan. 30, 2024; 11 pages.

* cited by examiner

SYSTEMS AND METHODS FOR REMOVING CARBON DIOXIDE FROM A FLUID

CROSS-REFERENCE

This application is a continuation of International Application No. PCT/US2023/070724, filed Jul. 21, 2023, which claims the benefit of U.S. Provisional Application No. 63/480,463, filed Jan. 18, 2023, and to U.S. Provisional Application No. 63/369,141, filed Jul. 22, 2022, each of which is incorporated herein in their entirety by reference thereto.

BACKGROUND

The described embodiments relate generally to systems and methods for capturing carbon dioxide from a fluid (e.g., air). More particularly, the described embodiments relate to systems and methods for adsorbing carbon dioxide from air and regenerating the adsorbed carbon dioxide to obtain carbon dioxide gas with high purity levels.

BRIEF SUMMARY

Some embodiments described herein relate to a system for extracting carbon dioxide from a fluid. In some embodiments, the system includes a fluid source and a reactor. In some embodiments, the reactor includes an inlet to receive the fluid from the fluid source, an outlet to remove the fluid from the reactor, a first chamber in fluid communication with the inlet and the outlet, a second chamber in fluid communication with the inlet and the outlet, an electric conduit, and a closure. In some embodiments, the first chamber includes a first monolith, and the first monolith includes a first sorbent to adsorb carbon dioxide. In some embodiments, the second chamber includes a second monolith, and the second monolith includes a second sorbent to adsorb carbon dioxide. In some embodiments, the electric conduit provides an electric current to the first monolith and the second monolith to release carbon dioxide adsorbed by the first monolith and the second monolith. In some embodiments, the closure moves between a first position to seal the first chamber and a second position to seal the second chamber.

In some embodiments, the conduit provides the electric current to the first monolith when the closure is in the first position and provide the electric current to the second monolith when the closure is in the second position.

In some embodiments, the electric conduit includes a first electrode coupled to a surface of the first monolith and a second electrode coupled to a surface of the second monolith, and the electric conduit provides the electric current to the first monolith and second monolith through the first electrode and the second electrode. In some embodiments, the first electrode and the second electrode are parallel to a flow direction of the fluid.

In some embodiments, the electric conduit provides the electric current to heat the first monolith and second monolith to a temperature in a range of 80° C. to 200° C. In some embodiments, the electric conduit provides the electric current to heat the first monolith and second monolith to a temperature in a range of 120° C. to 150° C. In some embodiments, the electric conduit provides the electric current to heat the first monolith and second monolith to a temperature of 150° C. in less than 30 seconds.

In some embodiments, the closure is slidable between the first position to the second position.

In some embodiments, the system also includes a first sensor to detect the carbon dioxide concentration of the fluid at the inlet and a second sensor to detect the carbon dioxide concentration of the fluid at the outlet.

In some embodiments, the closure slides based on a difference between the concentration of carbon dioxide at the inlet and the outlet.

In some embodiments, the system also includes a collector to collect carbon dioxide that is released from the first sorbent and the second sorbent.

In some embodiments, each of the first sorbent and the second sorbent includes at least one of a metal carbonate or an amine. In some embodiments, the metal carbonate compound includes at least one of potassium carbonate or calcium carbonate. In some embodiments, the amine is one of monoethylamine, glycine, sarcosine, polyethylenimine, ("PEI"), polyaziridine, linear and/or branched surfactants (e.g., lauric acid), or combinations thereof.

In some embodiments, the electric current is in a range of 0.1 A to 30 A.

In some embodiments, a difference between the pressure of the fluid at the inlet and the pressure of the fluid at the outlet is in a range of 0.2 inches of water column to 1.1 inches of water column. In some embodiments, the difference between the pressure of the fluid at the inlet and the pressure of the fluid at the outlet is about 0.5 inches of water column.

In some embodiments, the system also includes a fan to direct the fluid from the fluid source to the inlet, and fan is in fluid communication with the outlet.

In some embodiments, the fluid source is a cooling tower. In some embodiments, the fluid is a gas including carbon dioxide. In some embodiments, the fluid is ambient air.

In some embodiments, the fluid is polluted air. In some embodiments, each of the first sorbent and the second sorbent has a life of 100 cycles to 4000 cycles.

In some embodiments, the reactor also includes a first carbon dioxide outlet in fluid communication with the first chamber and a second carbon dioxide outlet in fluid communication with the second chamber. In some embodiments, the first carbon dioxide outlet removes carbon dioxide released from the first monolith, and the second carbon dioxide outlet removes carbon dioxide released from the second monolith.

In some embodiments, the system also includes a first vacuum pump in fluid communication with the first carbon dioxide outlet and a second vacuum pump in fluid communication with the second carbon dioxide outlet.

In some embodiments, the system also includes a third sensor to detect an amount of carbon dioxide at the first carbon dioxide outlet and a fourth sensor to detect an amount of carbon dioxide at the second carbon dioxide outlet.

In some embodiments, the first chamber includes a first array of monoliths, and the second chamber includes a second array of monoliths. In some embodiments, the first array of monoliths includes the first monolith, and the second array of monoliths includes the second monolith.

Some embodiments described herein relate to a method for extracting carbon dioxide from a fluid. In some embodiments, the method includes flowing the fluid from a fluid source to a first chamber, contacting the fluid with a first sorbent disposed in the first chamber such that the first sorbent adsorbs carbon dioxide from the fluid, moving a closure to a first position to seal the first chamber, and applying electric current to the first sorbent to heat the first sorbent to a predetermined temperature to extract carbon dioxide from the first sorbent. In some embodiments, the closure is moveable between the first position that seals the first chamber and a second position that seals a second chamber. In some embodiments, the second chamber includes a second sorbent disposed in the second chamber.

In some embodiments, the method also includes flowing the fluid from the fluid source to the second chamber, when the closure is in the first position, and contacting the fluid with the second sorbent such that the second sorbent adsorbs carbon dioxide from the fluid.

In some embodiments, the applying the electric current to the first sorbent and the contacting the fluid with the second sorbent occurs simultaneously.

In some embodiments, the applying the electric current to the first sorbent is done until at least 80% of carbon dioxide has been released from the first sorbent. In some embodiments, after applying the electric current to the first sorbent, the method also includes moving the closure from the first position to the second position to unseal the first chamber and seal the second chamber, and applying electric current to the second sorbent to heat the second sorbent to the predetermined temperature to extract carbon dioxide from the second sorbent.

In some embodiments, the method also includes monitoring the concentration of carbon dioxide at the inlet, monitoring the concentration of carbon dioxide at the outlet. In some embodiments, the moving of the closure between the first position and the second position is based on a difference between the concentration of carbon dioxide at the inlet and at the outlet.

In some embodiments, the method also includes moving the closure to the second position to seal the second chamber after a time period in a range of 20 minutes to 60 minutes.

In some embodiments, the moving the closure to the first position is performed when the first sorbent is 70% to 90% saturated with carbon dioxide.

In some embodiments, the method also includes collecting the carbon dioxide extracted from the first sorbent and the second sorbent and sequestering the collected carbon dioxide.

In some embodiments, the predetermined temperature is in a range of 80° C. to 200° C. In some embodiments, the predetermined temperature is in a range of 120° C. to 180° C. In some embodiments, the predetermined temperature is 150° C. In some embodiments, the electric current is applied for 30 seconds or less (e.g., 5 seconds to 30 seconds or 20 seconds to 30 seconds) to reach the predetermined temperature.

In some embodiments, the electric current is in a range of 0.1 A to 30 A.

In some embodiments, the method also includes hermetically sealing the first chamber before applying the electric current to the first sorbent.

Some embodiments described herein relate to a reactor for extracting carbon dioxide from a fluid. In some embodiments, the reactor includes an inlet to receive a fluid including carbon dioxide, a first chamber including a first monolith to adsorb carbon dioxide from the fluid, a second chamber including a second monolith to adsorb carbon dioxide from the fluid, a closure slidably coupled to the reactor, and an electric conduit. In some embodiments, the closure slides between a first position that seals the first chamber and a second position that seals the second chamber. In some embodiments, the electric conduit applies electric current to the first monolith when the closure is in the first position to release carbon dioxide adsorbed by the first monolith and applies electric current to the second monolith when the closure is in the second position to release carbon dioxide adsorbed by the second monolith.

In some embodiments, the closure slides between the first position and the second position based on a difference between the amount of carbon dioxide at the inlet and the amount of carbon dioxide at an outlet of the reactor.

In some embodiments, the reactor also includes a first sensor to detect the carbon dioxide concentration of the fluid at the inlet and a second sensor to detect the carbon dioxide concentration of the fluid at an outlet of the reactor.

In some embodiments, each of the first monolith and the second monolith includes at least one of a metal carbonate or an amine.

In some embodiments, the metal carbonate compound includes at least one of potassium carbonate or calcium carbonate. In some embodiments, the amine is one of monoethylamine, glycine, sarcosine, polyethylenimine, ("PEI"), polyaziridine, linear and/or branched surfactants (e.g., lauric acid), or combinations thereof.

In some embodiments, the electric current is in a range of 0.1 A to 30 A.

In some embodiments, the electric conduit provides the electric current to heat the first monolith and second monolith to a temperature of 150° C. in 30 seconds or less.

In some embodiments, the reactor also includes an outlet, and a difference between a pressure of the fluid at the inlet and a pressure of the fluid at the outlet is in a range of 0.2 inches of water column to 1.1 inches of water column. In some embodiments, the difference between the pressure of the fluid at the inlet and the pressure of the fluid at the outlet is about 0.5 inches of water column.

In some embodiments, the fluid is a gas including carbon dioxide. In some embodiments, the fluid is one of ambient air or polluted air.

In some embodiments, the first chamber includes a first array of monoliths, and the second chamber includes a second array of monoliths. In some embodiments, the first array of monoliths includes the first monolith, and the second array of monoliths includes the second monolith.

Some embodiments described herein relate to a method for extracting carbon dioxide from a fluid. The method can include flowing the fluid from a fluid source to a first chamber; contacting the fluid with a first sorbent disposed in the first chamber such that the first sorbent adsorbs carbon dioxide from the fluid; moving a closure to a first position to seal the first chamber, the closure being movable between the first position that seals the first chamber and a second position that seals a second chamber, the second chamber comprising a second sorbent disposed in the second chamber; and applying electric current to the first sorbent to heat the first sorbent to a predetermined temperature to extract carbon dioxide from the first sorbent.

In some embodiments, the method includes flowing, when the closure is in the first position, the fluid from the fluid source to the second chamber; and contacting the fluid with the second sorbent such that the second sorbent adsorbs carbon dioxide from the fluid.

In some embodiments, the applying the electric current to the first sorbent and the contacting the fluid with the second sorbent occurs simultaneously. In some embodiments, the electric current to the first sorbent is done until at least 80% of carbon dioxide has been released from the first sorbent.

In some embodiments, after applying the electric current to the first sorbent, the method further comprises moving the closure from the first position to the second position to unseal the first chamber and seal the second chamber; and applying electric current to the second sorbent to heat the second sorbent to the predetermined temperature to extract carbon dioxide from the second sorbent.

In some embodiments, the method includes monitoring the concentration of carbon dioxide at the inlet; and monitoring the concentration of carbon dioxide at the outlet. In some embodiments, the moving of the closure between the first position and the second position is based on a difference between the concentration of carbon dioxide at the inlet and at the outlet.

In some embodiments, the moving the closure to the second position to seal the second chamber after a time period in a range of 20 minutes to 60 minutes.

In some embodiments, the moving the closure to the first position is performed when the first sorbent is 70% to 90% saturated with carbon dioxide.

In some embodiments, the method includes collecting the carbon dioxide extracted from the first sorbent and the second sorbent; and sequestering the collected carbon dioxide.

In some embodiments, the predetermined temperature is in a range of 80° C. to 200° C. In some embodiments, the predetermined temperature is in a range of 120° C. to 180° C. In some embodiments, the predetermined temperature is 150° C.

In some embodiments, the electric current is applied for 30 seconds or less to reach the predetermined temperature. In some embodiments, the electric current is in a range of 0.1 A to 30 A.

In some embodiments, the method includes hermetically sealing the first chamber before applying the electric current to the first sorbent.

Some embodiments described herein relate to a reactor for extracting carbon dioxide from a fluid. In some embodiments, the reactor includes an inlet configured receive a fluid comprising carbon dioxide; a first chamber comprising a first monolith configured to adsorb carbon dioxide from the fluid; a second chamber comprising a second monolith configured to adsorb carbon dioxide from the fluid; a closure slidably coupled to the reactor, the closure configured to slide between a first position that seals the first chamber and a second position that seals the second chamber; and an electric conduit. In some embodiments, the electric conduit is configured to: apply electric current to the first monolith when the closure is in the first position to release carbon dioxide adsorbed by the first monolith; and apply electric current to the second monolith when the closure is in the second position to release carbon dioxide adsorbed by the second monolith.

In some embodiments, the closure is configured to slide between the first position and the second position based on a difference between the amount of carbon dioxide at the inlet and the amount of carbon dioxide at an outlet of the reactor.

In some embodiments, the reactor includes a first sensor configured to detect the carbon dioxide concentration of the fluid at the inlet; and a second sensor configured to detect the carbon dioxide concentration of the fluid at an outlet of the reactor.

In some embodiments, each of the first monolith and the second monolith comprises a metal carbonate. In some embodiments, the metal carbonate compound comprises at least one of potassium carbonate or calcium carbonate.

In some embodiments, the electric current is in a range of 0.1 A to 30 A. In some embodiments, the electric conduit is configured to provide the electric current to heat the first monolith and second monolith to a temperature of 150° C. in 30 seconds or less.

In some embodiments, the reactor includes an outlet. In some embodiments, a difference between a pressure of the fluid at the inlet and a pressure of the fluid at the outlet is in a range of 0.2 inches of water column to 1.1 inches of water column. In some embodiments, the difference between the pressure of the fluid at the inlet and the pressure of the fluid at the outlet is about 0.5 inches of water column.

In some embodiments, the fluid is a gas comprising carbon dioxide. In some embodiments, the fluid is one of ambient air or polluted air.

In some embodiments, the first chamber comprises a first array of monoliths, and the second chamber comprises a second array of monoliths, and wherein the first array of monoliths comprises the first monolith, and the second array of monoliths comprises the second monolith.

Some embodiments described herein relate to a modular system comprising a plurality of reactors. In some embodiments, a first reactor of the plurality of reactors is the reactor according to any of the embodiments described herein.

In some embodiments, the first reactor is removably coupled to a second reactor of the plurality of the reactors.

In some embodiments, the modular system comprises a duct coupled to each of the plurality of reactors.

Some embodiments described herein relate to a method of making a carbon monolith. In some embodiments, the method includes mixing carbon with at least one of a binder or an additive to form a mixture; extruding the mixture to form a monolith structure; drying the monolith structure to a moisture content of 0 w % to about 10 wt %; calcining the monolith structure; soaking the monolith structure in an aqueous solution, the aqueous solution comprising a metal; flowing air over the monolith structure to remove excess liquid from the monolith structure; heating the monolith structure using an alternating current joule heating. In some embodiments, the binder comprises one or more of a silicate solution, whey, baking flour, bentonite, natural clays, synthetic clays, or combinations thereof. In some embodiments, the additive comprises one or more of graphite, formaldehyde, resorcinol, carbon fiber, carbon nanotubes, carbon nanofibers, nanodiamonds, buckyballs, pure or ligated metal (e.g., copper, aluminum, iron, gold, platinum, palladium, silver), nanoparticles or oxides thereof, zeolites, metal-organic frameworks, covalent organic frameworks, natural or synthetic silicas, polyamine polymers, polyethylene glycol, amino acids, a single or mixture of metal carbonate salts, or combinations thereof.

Some embodiments described herein relate to a reactor for extracting carbon dioxide from a fluid. In some embodiments, the reactor includes an inlet configured receive a fluid comprising carbon dioxide; an outlet configured to remove the fluid from the reactor; a chamber comprising a monolith configured to adsorb carbon dioxide from the fluid; a first closure hingedly coupled to the inlet and configured to move between a closed position and an open position, wherein the first closure seals the inlet in the closed position; an electric conduit configured to apply electric current to the monolith when the first closure is in the closed position.

In some embodiments, the reactor includes a second closure hingedly coupled to the outlet and configured to move between a closed position and an open position, wherein the second closure seals the outlet in the closed position.

In some embodiments, the reactor includes a first hydraulic cylinder configured to move the first closure between the closed position and the open position, and a second hydraulic cylinder configured to move the second closure between the closed position and the open position. In some embodiments, the first hydraulic cylinder is configured to move the first closure between the first position and the second position based on a difference between the amount of carbon dioxide at the inlet and the amount of carbon dioxide at the outlet.

In some embodiments, the reactor includes a first clamp configured to secure the first closure in the closed position; and a second clamp configured to secure the second closure in the closed position.

In some embodiments, the reactor comprises a first sensor configured to detect the carbon dioxide concentration of the fluid at the inlet.

In some embodiments, the outlet is configured to be coupled to a duct, the duct comprising a fan configured to direct the fluid through the inlet.

In some embodiments, the monolith comprises a metal carbonate. In some embodiments, the metal carbonate compound comprises at least one of potassium carbonate or calcium carbonate.

In some embodiments, the electric current is in a range of 0.1 A to 30 A.

In some embodiments, the electric conduit is configured to provide the electric current to heat the monolith to a temperature of 150° C. in 30 seconds or less.

In some embodiments, a difference between a pressure of the fluid at the inlet and a pressure of the fluid at the outlet is in a range of 0.2 inches of water column to 1.1 inches of water column. In some embodiments, the difference between the pressure of the fluid at the inlet and the pressure of the fluid at the outlet is about 0.5 inches of water column.

In some embodiments, the chamber comprises an array of monoliths, and wherein the first array of monoliths comprises the first monolith.

Some embodiments described herein relate a modular system comprising a plurality of reactors. In some embodiments, a first reactor of the plurality of reactors is the reactor of any of the embodiments described herein. In some embodiments, the first reactor is removably coupled to a second reactor of the plurality of reactors.

Some embodiments described herein relate to a modular system. In some embodiments, the modular system comprises a plurality of reactors includes a first reactor and a second reactor. In some embodiments, the first reactor includes an inlet configured to receive a fluid from a fluid source; a monolith comprising a sorbent configured to adsorb carbon dioxide; an electric conduit configured to provide an electric current to the monolith to release carbon dioxide adsorbed by the monolith; and a closure configured to move between a first position to a second position, wherein the closure is configured to seal the inlet in the first position. In some embodiments, the first reactor is removably coupled to the second reactor.

In some embodiments, the second reactor includes an inlet configured to receive the fluid from the fluid source; a monolith comprising a sorbent configured to adsorb carbon dioxide; an electric conduit configured to provide an electric current to the monolith to release carbon dioxide adsorbed by the monolith; and a closure configured to move between a first position to a second position, wherein the closure is configured to seal the inlet in the first position.

In some embodiments, the first reactor is stacked on the top of the second reactor.

In some embodiments, the first reactor is disposed horizontally next to the second reactor.

In some embodiments, the modular system includes a fan configured to direct the fluid through the inlet of the first reactor and the inlet of the second reactor.

In some embodiments, the modular system includes a control unit coupled to the first reactor and the second reactor.

In some embodiments, the modular system includes a carbon dioxide purification unit coupled to the first reactor and to the second reactor.

DETAILED DESCRIPTION

A significant portion of greenhouse gas emissions comes from carbon dioxide that is released into the atmosphere from numerous sources, including from HVAC systems, refrigeration systems, and industrial processes; land changes (e.g., deforestation); and burning fossil fuels, which can contribute to issues related to climate change. Often emissions are moved through cooling towers. Reducing carbon dioxide in the atmosphere is a priority across many governments and industries. One way to reduce carbon dioxide emissions is to avoid emissions altogether, but complete elimination of emissions is often impossible, impractical, or requires significant modifications and/or capital improvements to modify existing systems and processes.

Another way to reduce carbon dioxide in the atmosphere is removing carbon dioxide from emissions from various sources described above, for example by capturing carbon dioxide from emissions or from the air or from cooling towers moving air. However, there are several challenges related to capturing carbon dioxide, and existing systems are often difficult to implement at large scale.

For example, existing systems may be complicated systems with multiple components spread across different portions of the system. Such a system often needs significant modifications and/or capital improvements to implement carbon capture systems. Moreover, some retrofit carbon dioxide capture systems can interfere with the normal performance of equipment to which they are added, either as a result of the upfront modification or due to the limited capacity or efficiency of existing carbon dioxide capturing systems. Lastly, existing systems often use significant amounts of raw materials, fresh water, and energy, which can counteract the targeted environmental benefits.

Embodiments disclosed herein overcome these and other challenges by providing—among other benefits—systems and methods for capturing carbon dioxide at the point of emission or from the atmosphere that can be efficiently integrated into existing industrial equipment. Moreover, embodiments disclosed herein can not only remove carbon dioxide from a fluid stream but also adsorb the carbon dioxide for later regeneration and eventually sequestration. In some embodiments, a system (e.g., system 10) integrates carbon dioxide separation and collection. In some embodiments, the system can be easily integrated into existing systems (e.g., cooling towers), which can reduce capital cost and installation time. In some embodiments, the system is modular. Modularity can allow the system to be built quickly, make the system easily adaptable to different site conditions, allow for rapid scaling up and scaling down, and lower the cost for packaging and shipping. Moreover, systems disclosed herein can integrate with systems, such as cooling towers, without significantly impacting performance of the systems.

Figure 1:
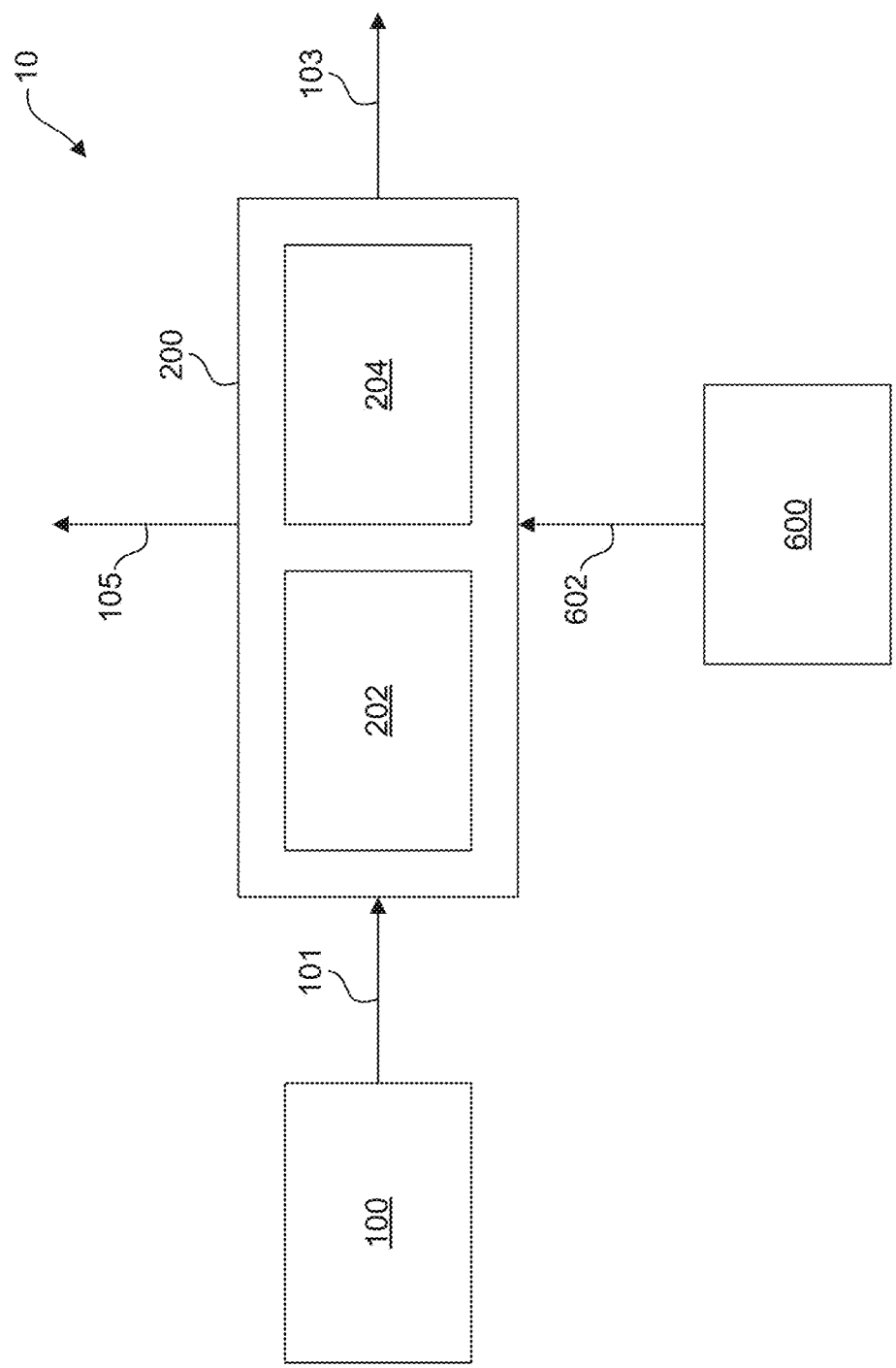
FIG. 1 illustrates a system for extracting carbon dioxide according to some embodiments.

FIG. 1 illustrates a flow chart for a carbon dioxide capturing system (e.g., system 10) according to some embodiments. In some embodiments, system 10 includes fluid source 100, reactor 200 having contactor mode 202 and regenerator mode 204, and power source 600.

In some embodiments, fluid source 100 provides fluid 102 to reactor 200 through inlet stream 101. In some embodiments, fluid 102 includes a greenhouse gas (e.g., carbon dioxide). Although system 10 is described throughout as removing carbon dioxide from a fluid, it is to be understood that system 10 could be used to remove other gases or contaminants, such as other greenhouse gases. In some embodiments, fluid 102 is ambient air. In some embodiments, ambient air is non-polluted air processed by sources such as HVAC systems and refrigeration systems. In some embodiments, fluid 102 includes polluted air. In some embodiments, polluted air is air containing elevated levels of hazardous or toxic components, such as particulate matter or volatile organic compounds. In some embodiments, fluid source 100 includes a cooling tower and fluid 102 is the emissions from the cooling tower. In some embodiments, fluid source 100 is fluid to be passed through a cooling tower. In some embodiments, fluid 102 can be a gas other than air. In some embodiments, fluid 102 can be a mixture of different gasses. In some embodiments, system 10 can be integrated into existing systems, such as cooling towers (e.g., cooling tower 800). Cooling towers already flow large amounts of fluid, for example air, so integrating system 10 into cooling towers reduces energy consumption and land use. However, it is to be understood that some embodiments can also be integrated into other industrial systems and equipment, such as a point of emission in a power plant.

In some embodiments, system 10 includes reactor 200. In some embodiments, reactor 200 can be an integral reactor that can perform different stages of the carbon dioxide capturing process, such as adsorption and regeneration. This can reduce the total size requirements for the carbon dioxide capturing system and make it readily compatible with various industrial equipment. In some embodiments, as discussed in more detail below, reactor 200 can operate continuously by having multiple chambers to simultaneously perform adsorption and regeneration. This can increase the efficiency of the capturing process. In some embodiments, the assembly is designed to minimize the pressure drop or velocity change of the air flowing through reactor 200, thereby minimizing the interference with a normal operation of the equipment in which system 10 can be integrated. In some embodiments, as discussed in detail below, reactor 200 can include a solid monolith for adsorption. In some embodiments, as discussed in detail below, reactor 200 uses an energy efficient regeneration process.

In some embodiments, reactor 200 includes one or more contactors 202 and one or more regenerators 204 disposed within reactor 200. In some embodiments, contactor 202 and regenerator 204 are separate structures within reactor 200, and in some embodiments, contactor 202 and regenerator 204 make an integral structure within reactor 200. In some embodiments, reactor 200 can include inlet stream 101, first product stream 103, and second product stream 105. In some embodiments, reactor 200 includes one or more monoliths 212. In some embodiments, monolith 212 is an activated carbon monolith impregnated with a sorbent material (e.g., sorbent 214). In some embodiments, sorbent 214 can adsorb carbon dioxide. In some embodiments, fluid 102 from fluid source 100 can flow into reactor 200 through inlet stream 101 and contact monolith 212. In some embodiments, when fluid 102 contacts monolith 212, monolith 212 can adsorb carbon dioxide from fluid 102, and the remaining fluid 104 (e.g., fluid 102 less carbon dioxide) exits reactor 200 through first product stream 103.

Figure 3:
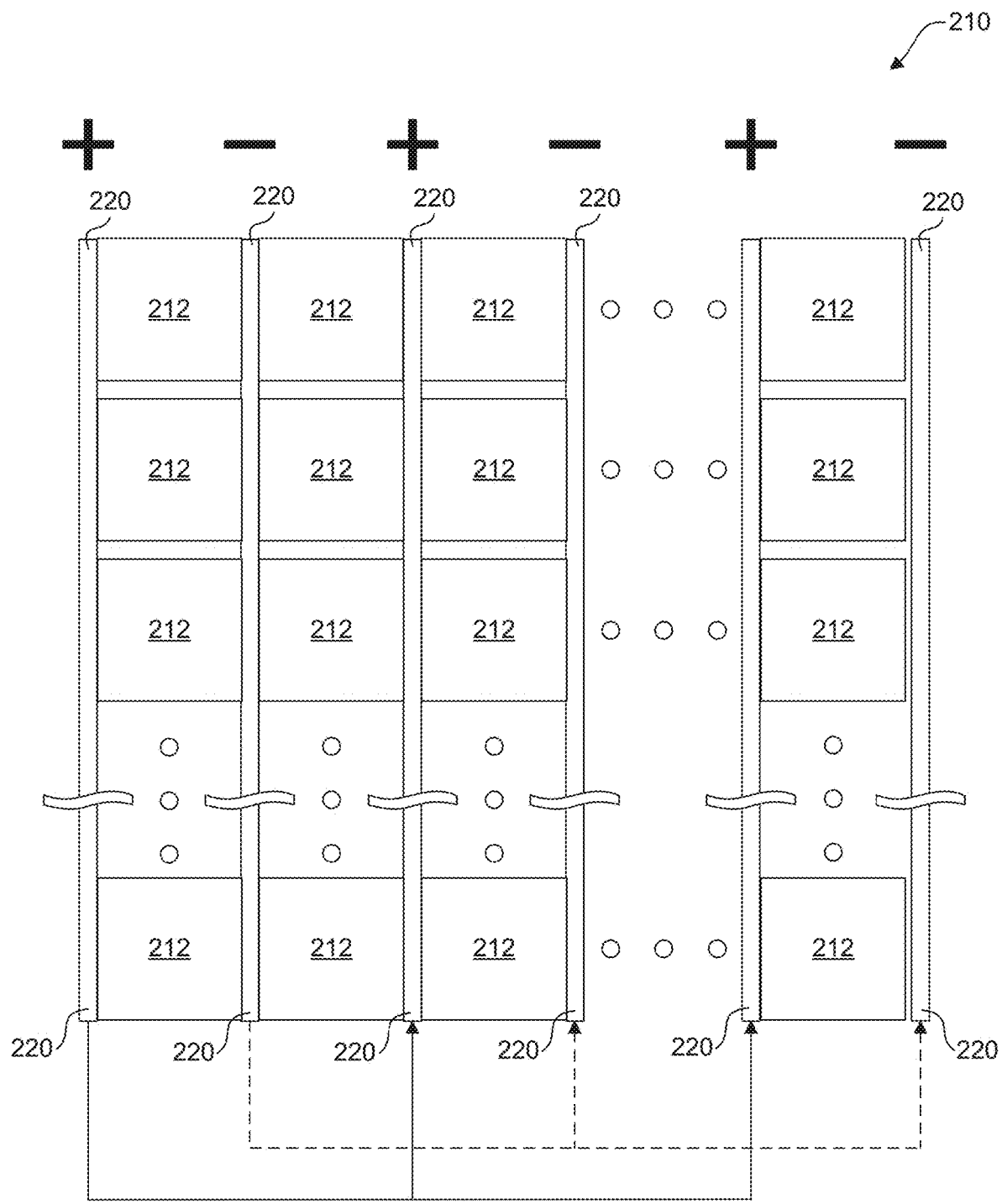
FIG. 3 illustrates an array of monoliths according to some embodiments.
Figure 4:
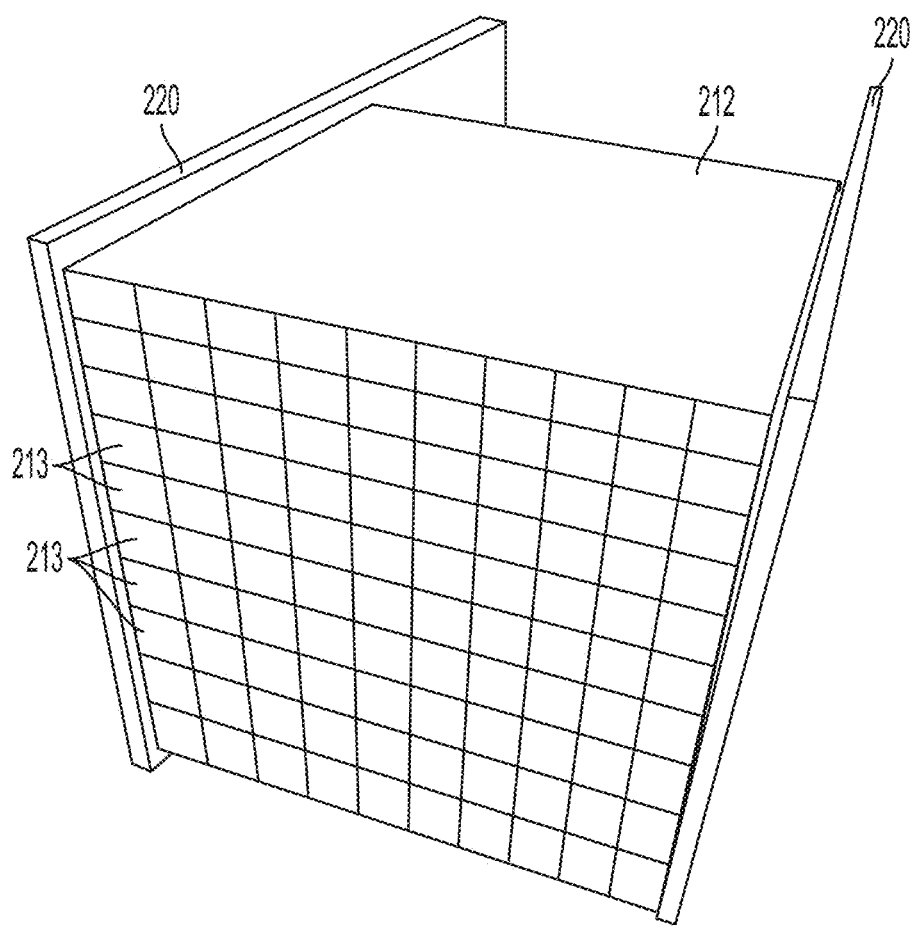
FIG. 4 illustrates a monolith according to some embodiments.

Reactor 200 can include an array of monoliths (e.g., array 210 of monoliths 212), as shown in FIGS. 3 and 6-8. Array 210 can include a grid pattern of monoliths 212. As shown in FIG. 3, array 210 can include multiple rows of monoliths 212 in series with electrodes 220 between each row of monoliths 212. Each row of monoliths 212 can be arranged in parallel to each other, as shown in FIG. 4. In some embodiments, array 210 is an array having dimensions a×b, where a is an integer from 1 to 250 and b is an integer from 1 to 250. In some embodiments, array 210 can have between 100 monoliths and 50,000 monoliths (e.g., between 1000 monoliths and 30,000 monoliths or between 10,000 monoliths and 20,000 monoliths). Each monolith 212 can have a length in a range of about 4 inches to about 20 inches, a width in a range of about 4 inches to about 20 inches, and a height in a rage of about 4 inches to about 20 inches. In some embodiments, each monolith includes 100 cells per square inch with 100 cells per square inch. For example, in some embodiments, a monolith having a width of 10 inches and a height of 10 inches can have 10,000 cells (e.g., cells 213).

Figure 6:
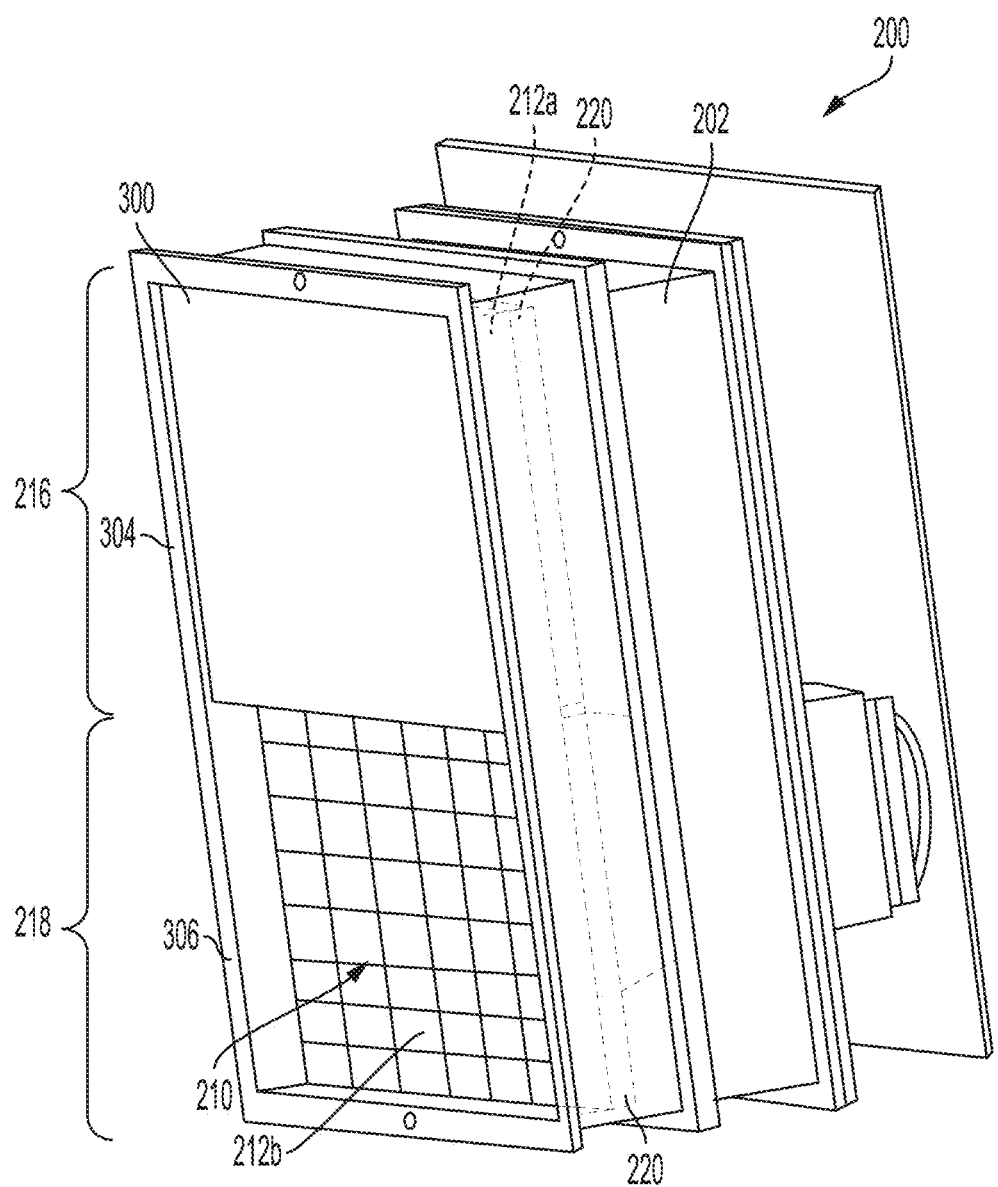
FIG. 6 illustrates a reactor according to some embodiments.
Figure 7:
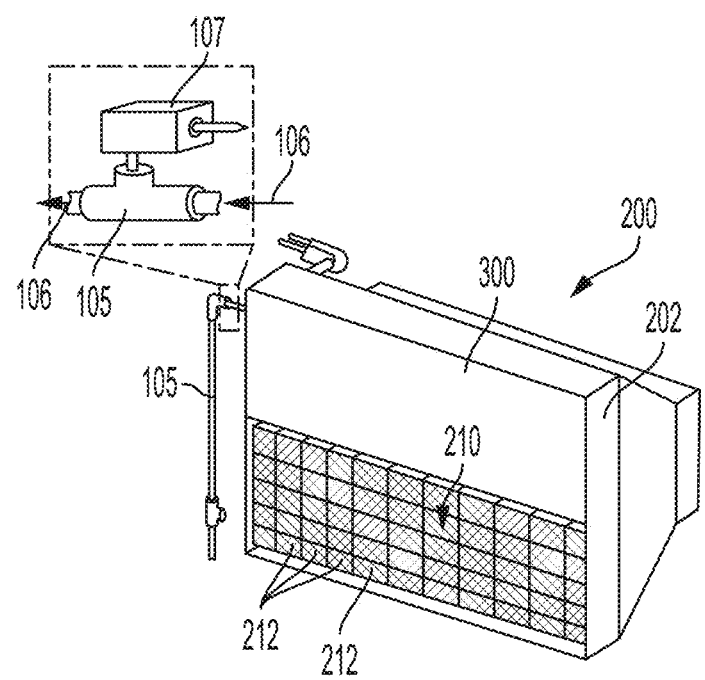
FIG. 7 illustrates a reactor according to some embodiments.
Figure 8:
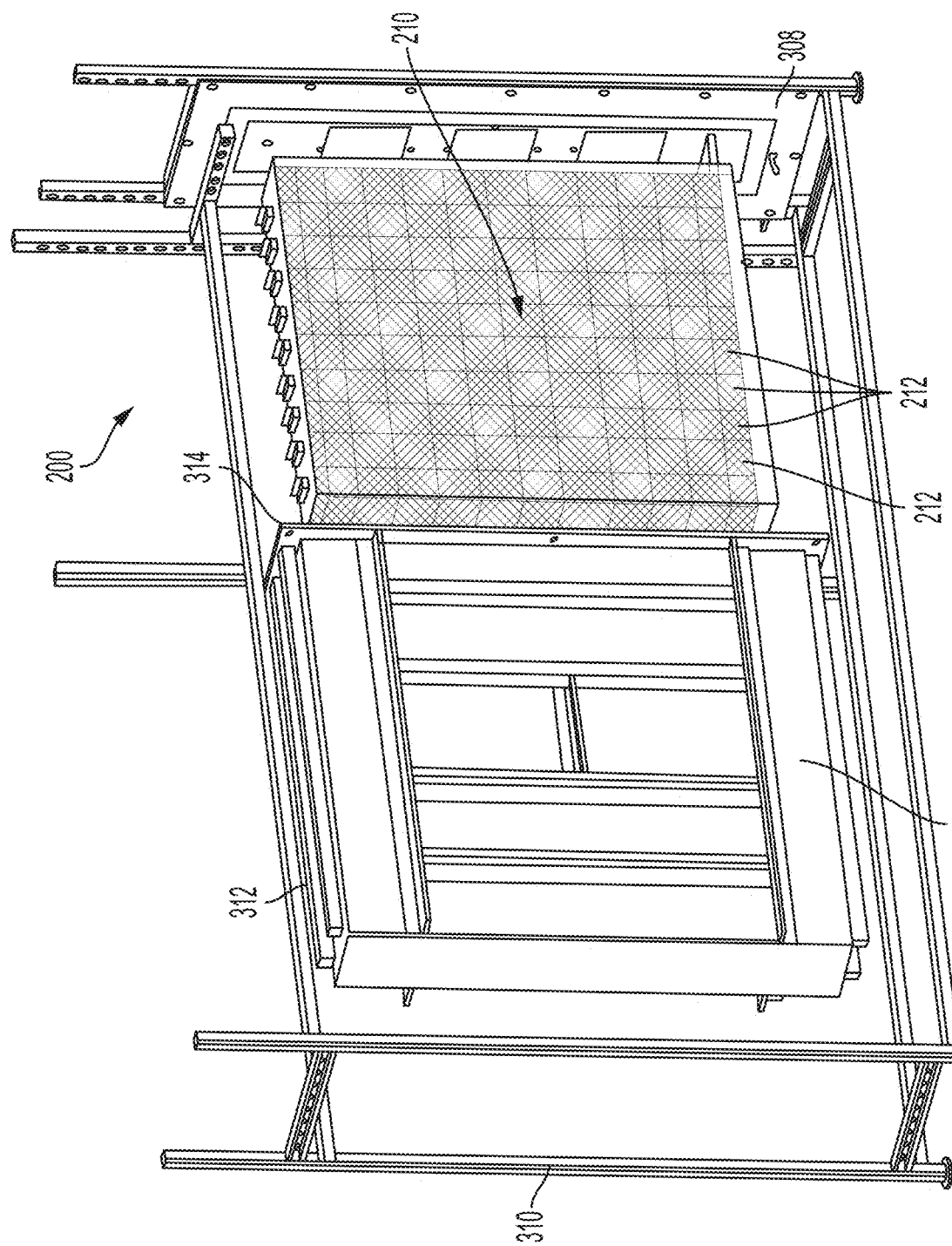
FIG. 8 illustrates a reactor according to some embodiments.

For example, FIG. 6 illustrates reactor 200 having a 1×2 array (e.g., array 210) of monoliths (e.g., monoliths 212a and 212b); FIG. 7 illustrates reactor 200 having a 12×6 array of monoliths; and FIG. 8 illustrates reactor 200 having a 10×11 array of monoliths. In some embodiments, reactor 200 includes one or more closures 300 and/or closures 320. In some embodiments, reactor 200 includes housing 302, frame 304 defining an opening, and F disposed around opening 204.

In some embodiments, after monolith 212 is saturated with carbon dioxide, regenerator 204 can heat monolith 212 (e.g., using electric current 602 provided by power source 600) to release the adsorbed carbon dioxide in monolith 212. Heating monolith 212 is discussed in more detail below. In some embodiments, the released carbon dioxide exits reactor as carbon dioxide-rich stream 106 through second product stream 105.

In some embodiments, fluid 102 flows through reactor 200 and contacts at least one monolith 212. In some embodiments, reactor 200 includes at least one monolith 212. In some embodiments, reactor 200 includes an array 210 of monoliths 212. In some embodiments, monolith 212 adsorbs carbon dioxide from fluid 102. In some embodiments, monolith 212 is a solid. In some embodiments, after monolith 212 adsorbs carbon dioxide, fluid 104 (e.g., fluid 102 less carbon dioxide) exits reactor 200 through product stream 103. In some embodiments, fluid 104 is released to the atmosphere. In some embodiments, reactor 200 is disposed at an inlet to a cooling tower, and fluid 104 exits reactor and is used for the original purposes of fluid source 100, such as a cooling media in a cooling tower.

In some embodiments, after monolith 212 is saturated with carbon dioxide, carbon dioxide is released from monolith 212. In some embodiments, power source 600 applies energy to monolith 212 to regenerate the adsorbed carbon dioxide. In some embodiments, power source 600 applies electric energy to cause joule heating of sorbent 214 to regenerate the adsorbed carbon dioxide. In some embodiments, extracted carbon dioxide-rich stream 106 exists regenerator 204 and reactor 200 for collection. In some embodiments, extracted carbon dioxide-rich stream exits regenerator 204 and reactor 200 through second product stream 105. In some embodiments, carbon dioxide-rich stream 106 comprises at least 90% carbon dioxide by volume (e.g., at least 95% carbon dioxide by volume or at least 99% carbon dioxide by volume. In some embodiments, carbon dioxide-rich stream 106 is sequestered for permanent removal from the atmosphere. In some embodiments, after regeneration, as discussed in detail below, monolith 212 can be re-used for additional adsorption and regeneration processes.

Figure 2A:
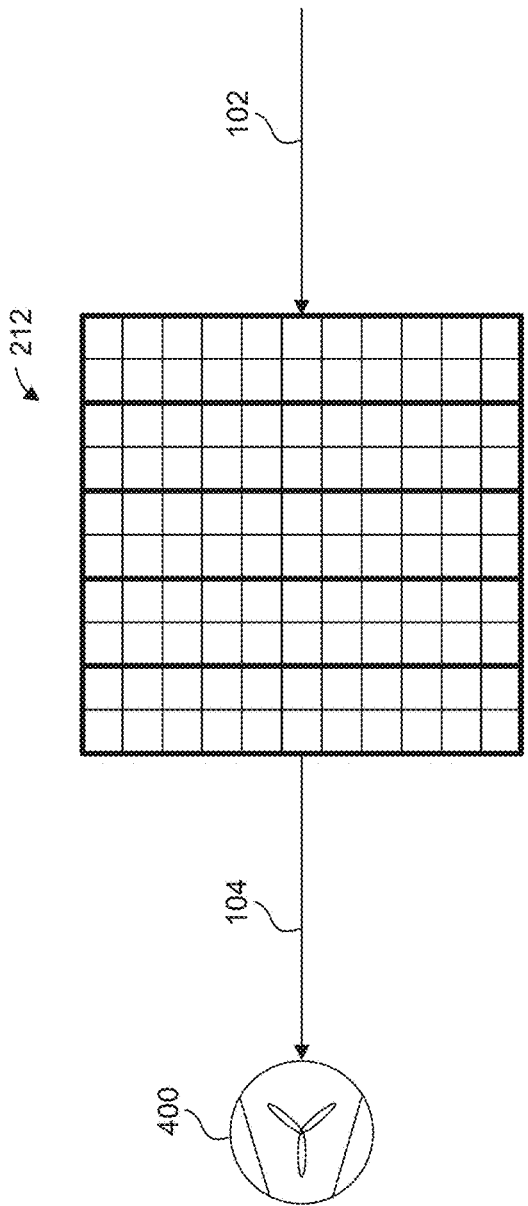
FIG. 2A illustrates a monolith in contacting mode according to some embodiments.
Figure 2B:
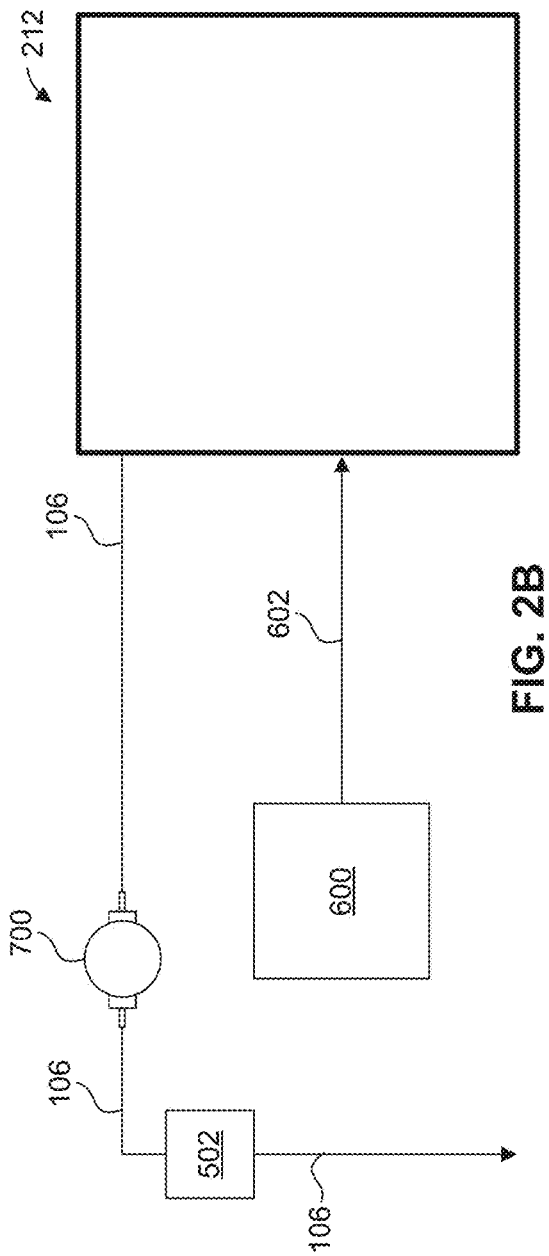
FIG. 2B illustrates a monolith in regeneration mode according to some embodiments.

Each monolith 212 within reactor 200 can adsorb and desorb (e.g., release) carbon dioxide. The adsorption occurs when monolith 212 is in "contacting" mode, and desorption occurs when monolith 212 is in "regeneration" mode. FIG. 2A illustrates the operation of system 10 as monolith 212 adsorbs carbon dioxide in contacting mode, and FIG. 2B illustrates the operation of system 10 when monolith 212 has been saturated and carbon dioxide is released in regeneration mode. In some embodiments, fluid 102 passes through monolith 212 to adsorb carbon dioxide from fluid 102. In some embodiments, system 10 includes fan 400 that pulls fluid 102 from fluid source 100 through monolith 212. In some embodiments, as shown in FIG. 2A, fan 400 is provided in fluid communicate with monolith 212 downstream of monolith 212. As illustrated in FIG. 2B, adsorbed carbon dioxide can be release from monolith 212 by applying electric current 602 (e.g., from power source 600) to monolith. In some embodiments, system 10 includes vacuum pump 700 downstream of monolith 212 to pull carbon dioxide-rich stream 106 from reactor 200.

Figure 5:
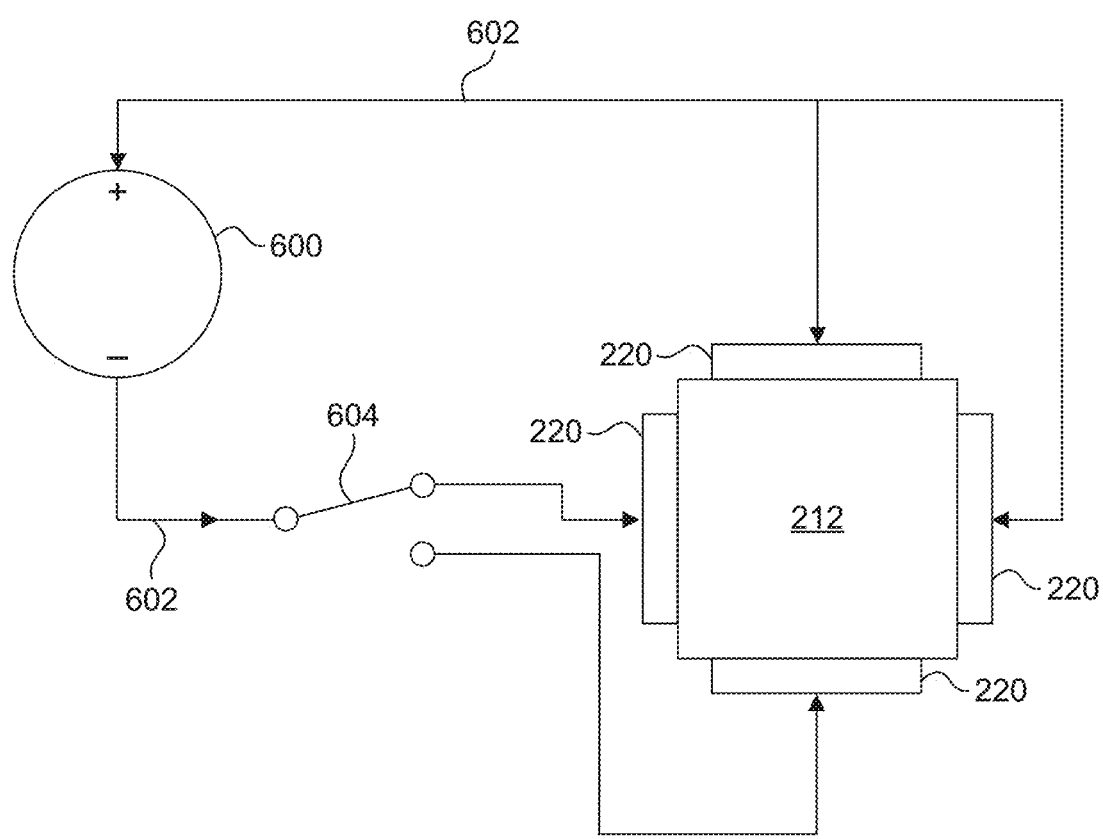
FIG. 5 illustrates an electrical system used with monoliths according to some embodiments.

As illustrated in FIGS. 3-5, monolith 212 can have various configurations of electrodes 220 that supply electric current 602 to monolith 212 depending on the specific equipment set up and energy needs of the system. In some embodiments, power source 600 applies electric current 602 to monolith 212. FIG. 4 illustrates a monolith 212 with electrodes 220 contacting side surfaces of monolith 212. In some embodiments, electrodes 220 are adhered to monolith 212. In some embodiments, electrodes 220 are adhered to monolith 212 using a conductive adhesive (e.g., a carbon fiber conductive adhesive). In some embodiments, electrodes 220 are oriented parallel to the direction of the flow fluid 102.

In some embodiments, as described in more detail below, the electric current 602 heats monolith 212 to release carbon dioxide from monolith 212. In some embodiments, electric current 602 heats monolith 212 to a range of about 60° C. to about 200° C. (e.g., about 80° C. to about 180° C., about 120° C. to about 150° C.). In some embodiments, electric current 602 heats monolith 212 to a temperature of about 150° C.

In some embodiments, monolith 212 is heated by joule heating, which increases efficiency of the system, especially at the temperatures required for efficient release of carbon dioxide. Although the monolith can be heated by other means, these often come with various drawbacks. For example, convection heating uses a condensable gas (e.g., steam) to separate streams. Typically very high temperature steam is required to achieve acceptable rates for carbon dioxide release. This results in an expensive, energy intensive process. Moreover, convection can increase impurities in the carbon dioxide that is removed from the fluid (e.g., fluid 102). Although a lower-temperature steam could be used, which could reduce energy requirements, steam at lower temperatures can take significantly longer to release carbon dioxide (e.g., on the order of hours). Conduction heating is also less efficient because the rate of release of carbon dioxide is limited by the coefficient of heat transfer of sorbent 214, which in most cases is not suitable for rapid release of carbon dioxide. Radiation heating is challenging to apply to internal areas of a reactor, making it unsuitable for applications disclosed herein. Lastly, induction heating requires special doping of the monolith and large volumes of the doping materials. Accordingly, the present inventors have found that joule heating provides relatively low energy heating with rapid release of carbon dioxide.

In some embodiments, power source 600 provides electric current 602 to cause joule heating of monolith 212. Joule heating applies electric current though monoliths 212 to cause electrons collide with atoms within monolith 212, thereby releasing energy in the form of heating. Joule heating as discussed herein is more rapid and improves energy use compared to traditional heating methods. First, joule heating does not require heat transfer, so it eliminates any inefficiencies or heat losses resulted from heat transfer, thereby allowing a more rapid heating.

Figure 11:
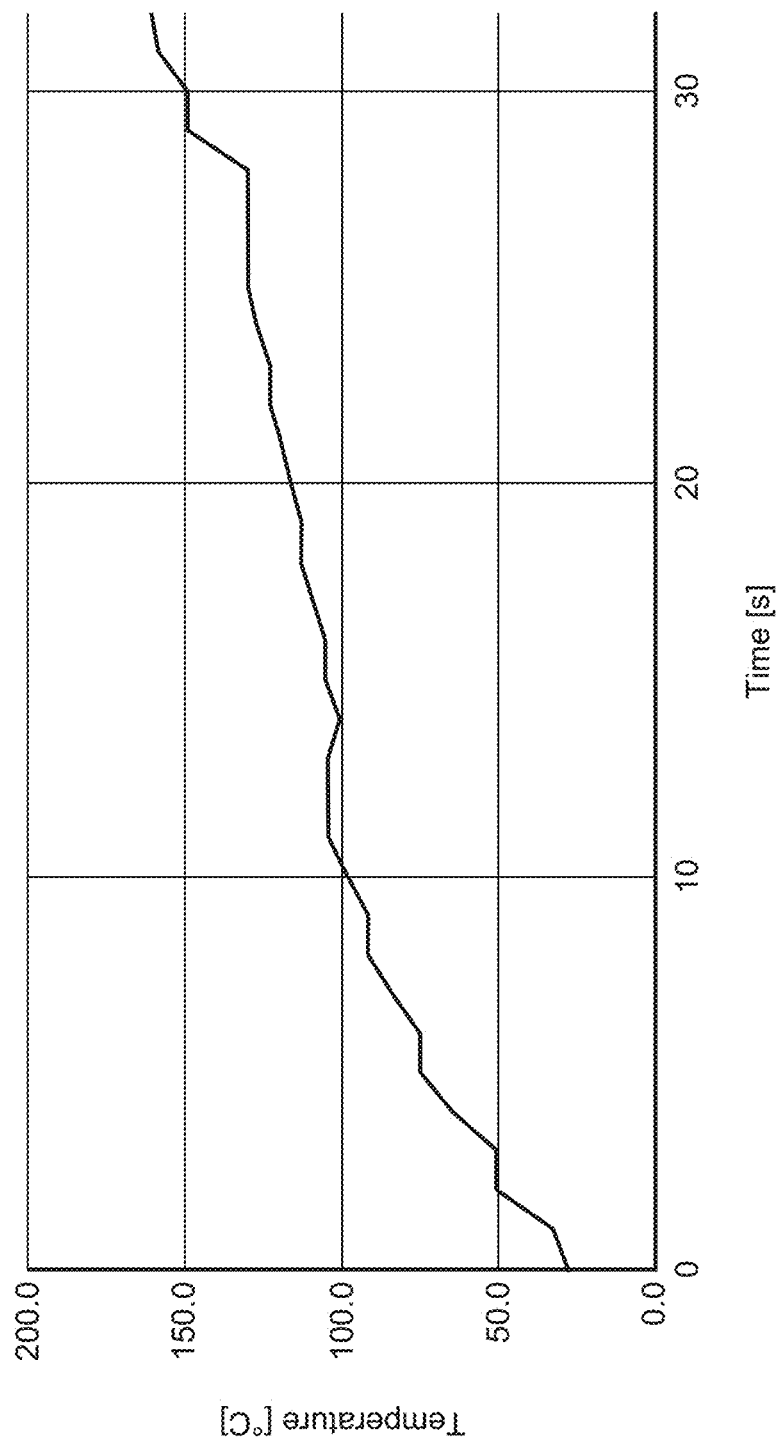
FIG. 11 illustrates the amount of carbon dioxide adsorbed over cycles.
Figure 12:
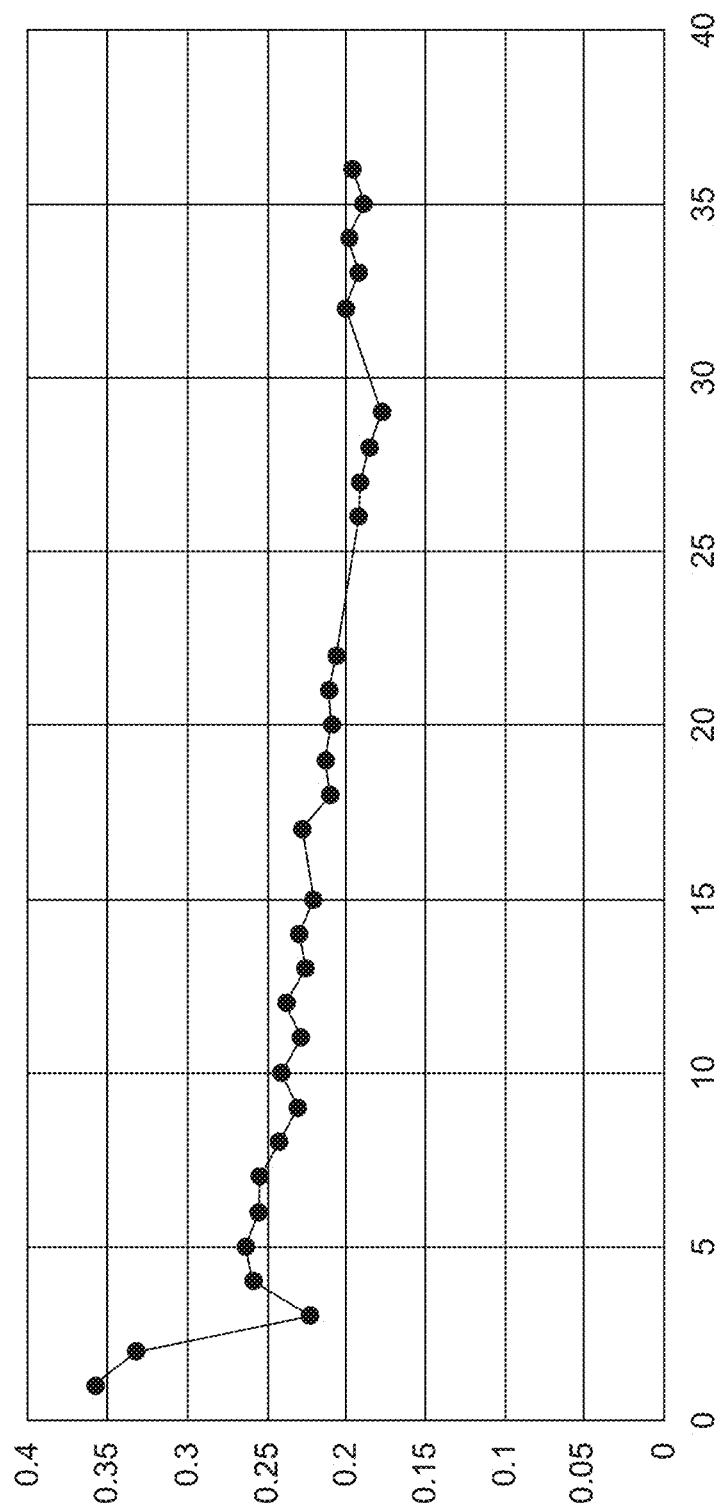
FIG. 12 is a chart showing sorbent capacity in relation to cycle numbers according to some embodiments.

FIG. 11 illustrates the rise of temperature of a monolith (e.g. monolith 212) over time using joule heating. As shown in FIG. 11, joule heating according to embodiments described herein can achieve temperatures of 80° C. in about 5 seconds, temperatures of about 120° C. in about 20 seconds, and temperatures of about 150° C. in about 30 seconds. Additionally, unlike other heating methods like those discussed above, joule heating increases the temperature locally, for example, where electric current is applied. This further minimizes unnecessary energy consumption.

In some embodiments, monolith 212 is heated by joule heating to a temperature at which regeneration (e.g., carbon dioxide release) typically begins (e.g. approximately 80° C.) in less than 10 seconds (e.g., about 5 second to about 10 seconds). In some embodiments, monolith 212 is heated by joule heating to a temperature of 80° C. in about 5 seconds.

FIGS. 3 and 4 show the setup of monolith 212 for regeneration according to various embodiments. Electrodes 220 are attached to surfaces of monolith 212, and power source 600 applies electric current to monolith 212 through electrodes 220. In some embodiments, electrodes 220 are provided on the sides of monolith 212 parallel to the flow direction of fluid 102, such that electrodes 220 do not obstruct the flow of fluid 102. In some embodiments, electrodes 220 are provided on two sides of monolith 212, as illustrated in FIGS. 3 and 4. In some embodiments, electrodes 220 are provided on four sides of monolith, as illustrated in FIG. 5. In some embodiments, electrodes 220 are pairs of bipolar electrodes.

Figure 13:
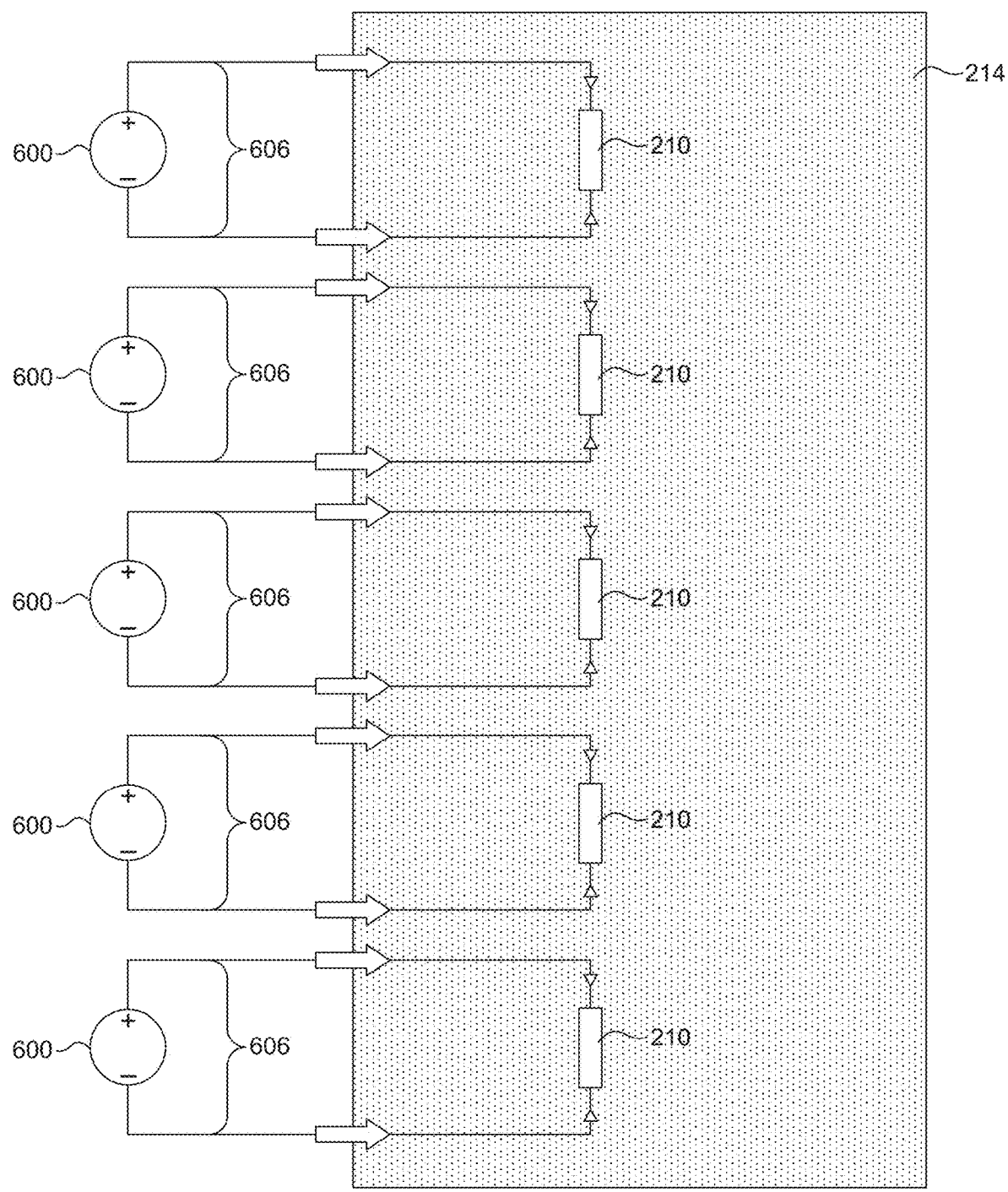
FIG. 13 illustrates an electrical system for multiple arrays of monoliths according to some embodiments.

In some embodiments, power source 600 applies electric current through a circuit. In some embodiments, the circuit can have a switch 604 to selectively apply electric current to specific electrodes. For example, as shown in FIG. 5, when switch 604 is at position A, electrodes 220 on the left and right sides of monolith 212 are activated, thereby applying a current through monolith 212 in a horizontal direction; when switch 604 is at position B, electrodes 220 on the top and bottom sides of monolith 212 are activated, thereby applying a current through monolith 212 in a vertical direction. In some embodiments, switch 604 can alternate between position A and position B to cause alternating heating between horizontal and vertical directions, thereby improve the homogeneity of temperature within monolith 212. FIG. 13 shows a set of up of an array of monoliths for regeneration according to some embodiments.

In some embodiments, power source 600 applies alternating current through monolith 212 between two electrodes 220. In some embodiments, monolith 212 is coated with a material that forms a solid-state electrolytic cell with metal electrodes (e.g., electrodes 220). Alternating current can be applied with a high frequency to reduce ionic migration within monolith 212 and interfacial redox reactions with electrodes 220. For example, the alternating current frequency can be in a range of about 2 kHz to about 200 kHz. In some embodiments, the alternating current frequency is in a range of about 2 kHz to about 200 kHz (e.g., about 50 kHz to about 150 kHz, or about 75 kHz to about 125 kHz). In some embodiments, the alternating current frequency is about 100 kHz.

High frequency alternating current used with embodiments discussed herein can improve the lifetime of monolith 212. For example, the alternation of the direction of current can outpace the harmful electrochemical processes that would have occurred within monolith 212 between two electrodes 220, thereby increasing the efficiency and lifetime of monolith 212. In some embodiments, when a high frequency alternating current is used (e.g. 2 kHz to 100 kHz), the lifetime of monolith 212 can be significantly increased. For example, when direct current is used, monolith 212 may have a lifetimes around 5 cycles. In contrast, when high frequency alternative current is used, monolith 212 can have a lifetime of about 1000 cycles to about 4000 cycles (e.g., about 1500 cycles). As used herein, a "cycle" includes heating monolith 212 to regeneration temperatures (e.g. about 75° C. to about 300° C. or about 130° C.) and cooling monolith 212 to ambient temperature (e.g. about −20° C. to about 32° C.).

Figure 18A:
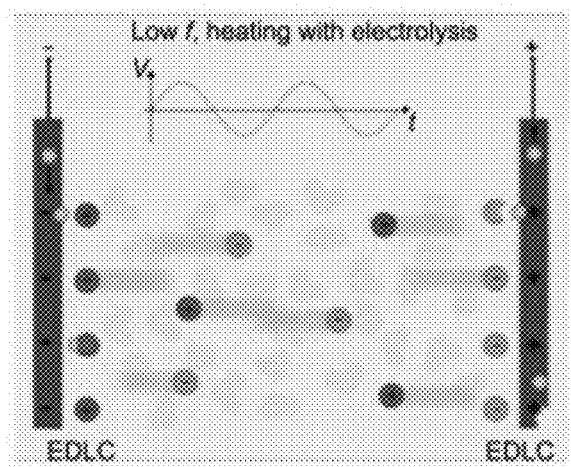
FIGS. 18A-18C illustrate the interaction of ions at the interface between electrodes and monoliths according to some embodiments.
Figure 18B:
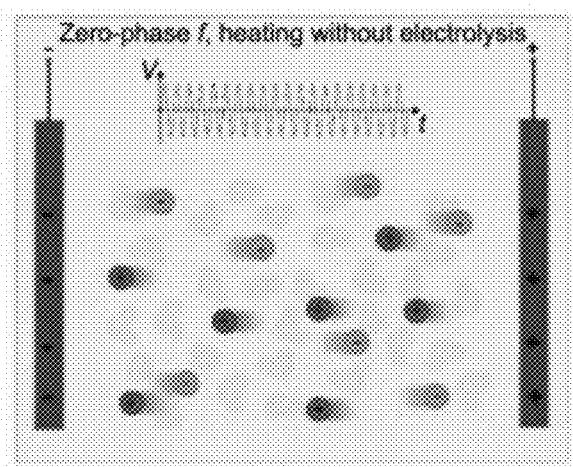
Figure 18C:
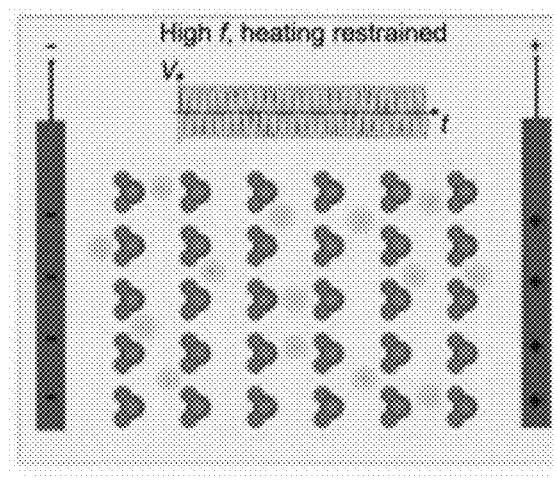
Figure 19:
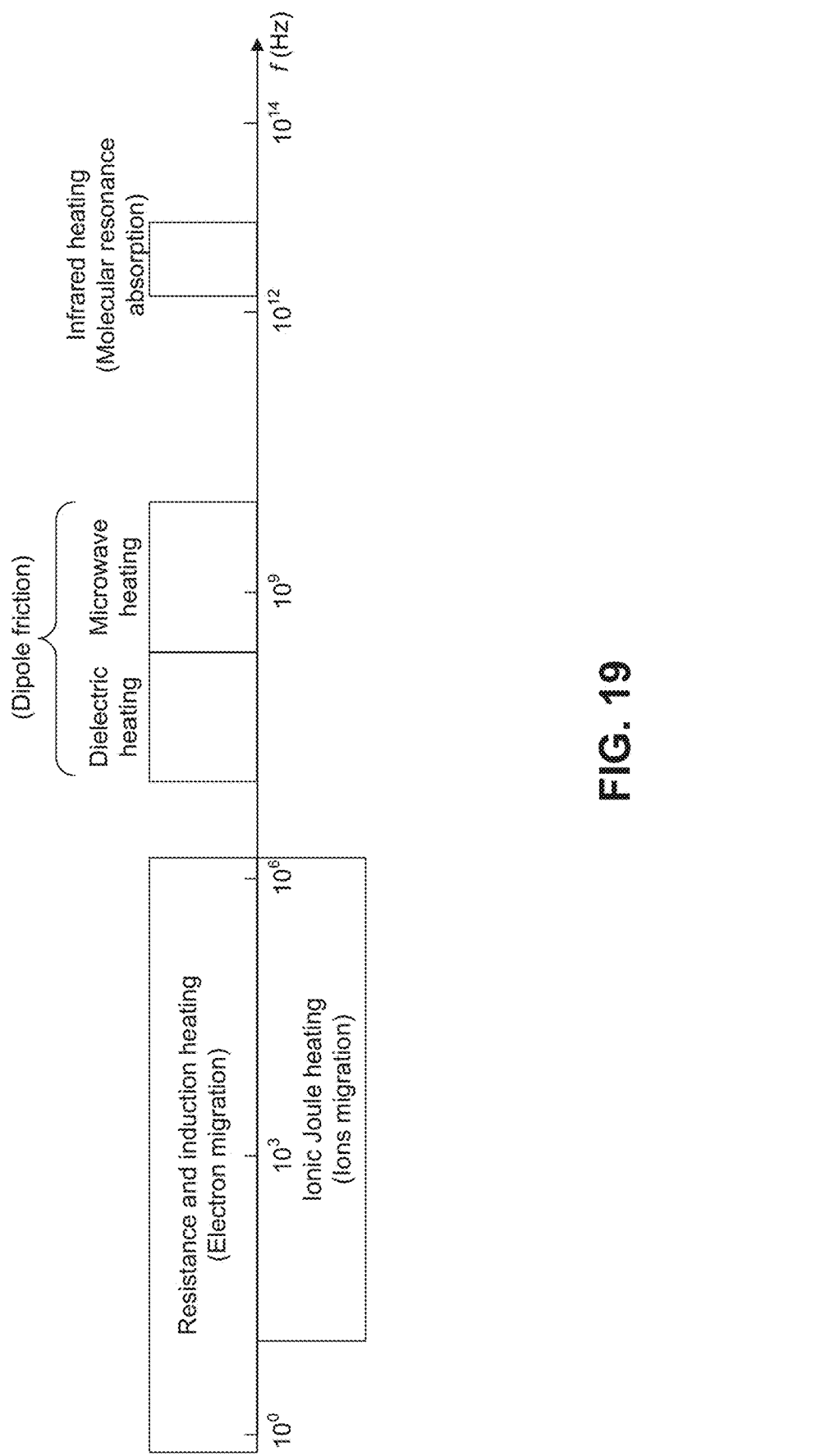
FIG. 19 illustrates frequency of heating according to various methods.

Additionally, heating efficiency can be improved by using high frequency alternating current. For example, when a high frequency alternating current is used (e.g. 2 kHz to about 100 kHz), it can prevent the formation of an Electron Double Layer Capacitor (EDLC) forming at the interface between monolith 212 and electrodes 220. Accordingly, the monolith-electrode cell can behave as a pure resistor, which can bring improved heating efficiency. FIGS. 18A-C illustrate the interaction at the interface of monolith 212 and electrodes 220. As shown in FIG. 18A, EDLC can form at the interface between monolith 212 and electrodes 220 when the alternating current frequency is low (e.g. about 1 Hz to about 2 kHz). When the frequency is increased to an optimized zero-phase frequency (e.g. about 2 kHz to about 110 kHz), as illustrated by FIG. 18B, the phase angle between voltage and current waveforms becomes zero, and no EDLC is formed at the interface between monolith 212 and electrodes 220. Further, as illustrated in FIG. 18C, at higher frequencies with heating restrained (e.g. more than about 110 kHz), no EDLC is formed. The EDLC formed at low frequency (e.g. about 1 Hz to about 2 kHz) can cause at least two issues with functionality. First, EDLC formation can cause deposition of sorbent from monolith 212, which can cause high resistance at the interface between monolith 212 and electrodes 220. Second, EDLC formation can cause sorbent migration within monolith 212 that can cause non-homogenous resistance, which in turn can cause uneven temperature distribution within monolith 212.

In some embodiments, electrodes 22 are carbon-coated electrodes. In some embodiments, carbon-coated electrodes can be used with high frequency alternating current to further optimize the lifetime of monolith 212, heating distribution within monolith 212, and heating efficiency. In some embodiments, a non-impregnated carbon layer is used between electrodes 220 and monolith 212 to provide a chemical barrier between the ions of sorbent 214 and electrodes 220. In some embodiments, the non-impregnated layer of carbon is activated carbon. In some embodiments, the non-impregnated layer of carbon is not activated carbon. In some embodiments, the carbon layer can include a graphite layer having a thickness of at least about 8 μm. In some embodiments, the carbon layer has a thickness of about 8 μm to about 150 μm (e.g., about 10 μm to about 140

μm, about 20 μm to about 125 μm, about 50 μm to about 100 μm, or about 75 μm to about 100 μm). In some embodiments, the carbon layer has a thickness of about 20 μm to about 150 μm (e.g. about 50 μm to about 125 μm, about 70 μm to about 90 μm). In some embodiments, the carbon layer has a density of about 5 mg/cm$^2$ to about 10 mg/cm$^2$, about 6 mg/cm$^2$ to about 9 mg/cm$^2$, or about 7 mg/cm$^2$ to about 8 mg/cm$^2$. In some embodiments, the carbon layer has a density of about 7.3 mg/cm$^2$.

In some embodiments, the carbon layer can include a copper layer. In some embodiments, the copper layer has a thickness of at least 5 μm. In some embodiments, the copper layer has a thickness of about 5 μm to about 150 μm (e.g., about 15 μm to about 140 μm, about 20 μm to about 125 μm, about 50 μm to about 100 μm, or about 75 μm to about 100 μm. In some embodiments, the copper layer has a thickness of about 90 μm. In some embodiments, monolith 212 includes a sorbent 214 that reacts with carbon dioxide to form a carbonate. In some embodiments, the sorbent can be a metal carbonate. In some embodiments, sorbent 214 can be potassium carbonate, calcium carbonate, or a mixture thereof. In some embodiments, sorbent 214 can include an amine. In some embodiments, the amine is monoethylamine, glycine, sarcosine, polyethylenimine, ("PEI"), polyaziridine, linear and/or branched surfactants (e.g., lauric acid), or a mixture thereof.

In some embodiments, monolith 212 is a solid structure that is impregnated with sorbent 214. Exemplary monoliths 212 or array 210 of monoliths 212 are illustrated in FIGS. 2A-5. In some embodiments, monolith 212 has a structure that allows fluid 102 to flow through monolith. In some embodiments, monolith 212 is treated or impregnated (e.g., by wet impregnation) with an aqueous solution containing sorbent 214.

In some embodiments, the aqueous solution for treating or impregnating monolith 212 can have various amounts of dissolved sorbent 214. The amount of sorbent 214 in the solution used to impregnate monolith 212 can affect the cumulative amount of carbon dioxide that can be adsorbed by monolith 212. For example, the solution can contain about 25 wt % to about 75 wt % (e.g., about 40 wt % to about 65 wt %) In some embodiments, the solution contains about 50 wt % of dissolved sorbent 214. In some embodiments, monolith 212 can adsorb between about 0.4 mmol and about 0.5 mmol of carbon dioxide per gram of sorbent 214. In some embodiments, monolith 212 is impregnated with a solution containing about 50 wt % sorbent 214, and monolith 212 can remove between about 0.45 mmol carbon dioxide per gram of sorbent 214. In some embodiments, monolith 212 can adsorb about 0.44 mmol CO2/g adsorbent in 400 minutes.

In some embodiments, monolith 212 can include conductive microporous and/or mesoporous activated carbon. In some embodiments, monolith 212 includes microporous activated carbon. In some embodiments, monolith 212 includes mesoporous activated carbon. In some embodiments, monolith 212 can include a hierarchical porous structure where the pores range from mesoporous to microporous.

In some embodiments, monolith 212 can include one or more binders. In some embodiments, monolith 212 includes binders, such as silicate solution, whey, baking flour, bentonite, natural clays, synthetic clays, or combinations thereof.

In some embodiments, monolith 212 can include one or more additives. In some embodiments, monolith 212 includes additives, such as graphite, formaldehyde, resorcinol, carbon fiber, carbon nanotubes, carbon nanofibers, nanodiamonds, buckyballs, pure or ligated metal (e.g., copper, aluminum, iron, gold, platinum, palladium, silver), nanoparticles or oxides thereof, zeolites, metal-organic frameworks, covalent organic frameworks, natural or synthetic silicas, polyamine polymers, polyethylene glycol, amino acids, a single or mixture of metal carbonate salts, or combinations thereof.

Figure 20:
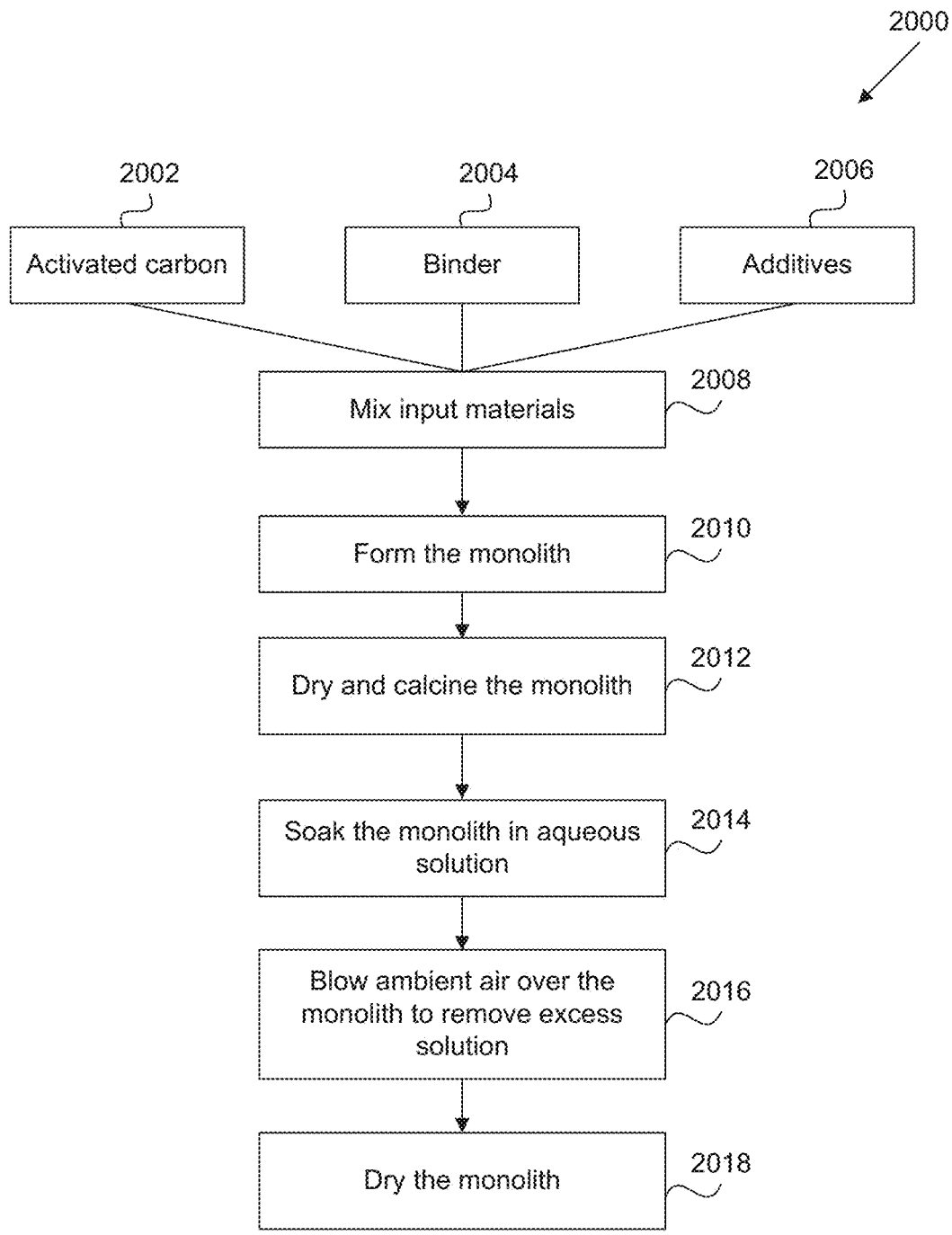
FIG. 20 illustrates a flowchart of a method according to some embodiments.

FIG. 20 illustrates a flowchart showing a method 2000 for manufacturing a monolith (e.g., monolith 212). In some embodiments, at step 2008, input materials are mixed. As illustrated in FIG. 20, the input materials can include one or more of activated carbon 2002, binder 2004, or additives 2006. Mixing at step 2008 can be done using various types of mixers, such as a rotary mixer, a planetary mixer, or a centrifugal mixer.

In some embodiments, at step 2010, the mixture can be formed into monolith 212, for example, by extrusion, molding, 3d-printing, or direct polymer synthesis with subsequent carbonization.

At step 2012, in some embodiments, monolith 212 is dried to a moisture content of about 0 wt % to about 10 wt %. In some embodiments, monolith 212 is dried to a moisture content of about 2 wt %. At step 2012, in some embodiments, manufactured monolith 212 is calcined under an inert gas at a temperature of 300° C. to about 900° C. for about 1 hour to about 24 hours. In some embodiments, monolith 212 is calcined at a temperature of about 700° C. In some embodiments, monolith 212 is calcined for about 6 hours. In some embodiments, the inert gas comprises helium, argon, nitrogen, or combinations thereof. In some embodiments, the inert gas has a purity of 99% or more.

In some embodiments, at step 2014, dried and calcined monolith 212 is soaked in an aqueous solution of a metal (e.g., a metal carbonate or a Group 1 element salt in the periodic table). In some embodiments, the aqueous solution comprises about 5 wt % to about 50 wt % of the metal. In some embodiments, the aqueous solution comprises about 25 wt % of the metal. In some embodiments, the metal is potassium carbonate. In some embodiments, monolith 212 is soaked in the aqueous solution for about 1 minute to about 24 hours, such as about 10 minutes to about 15 minutes.

In some embodiments, at step 2016, excess liquid is removed from soaked monolith 212 by passing a stream of air through each cell in monolith 212 and along the exterior of monolith 212. In some embodiments, the stream of ambient air (e.g. about −20° C. to about 32° C.) is at a pressure between about 20 psi to about 80 psi (e.g., about 55 psi). In some embodiments, the stream of air is passed through each cell for about 1 minutes to about 60 minutes (e.g., about 10 minutes).

In some embodiments, at step 2018, monolith 212 is dried by alternating current joule heating (described below related to method 2100) and under vacuum with consistent homogenous heating at temperatures between about 25° C. to about 150° C. In some embodiments, at step 2018, monolith 212 is dried under vacuum without heat application.

Figure 21:
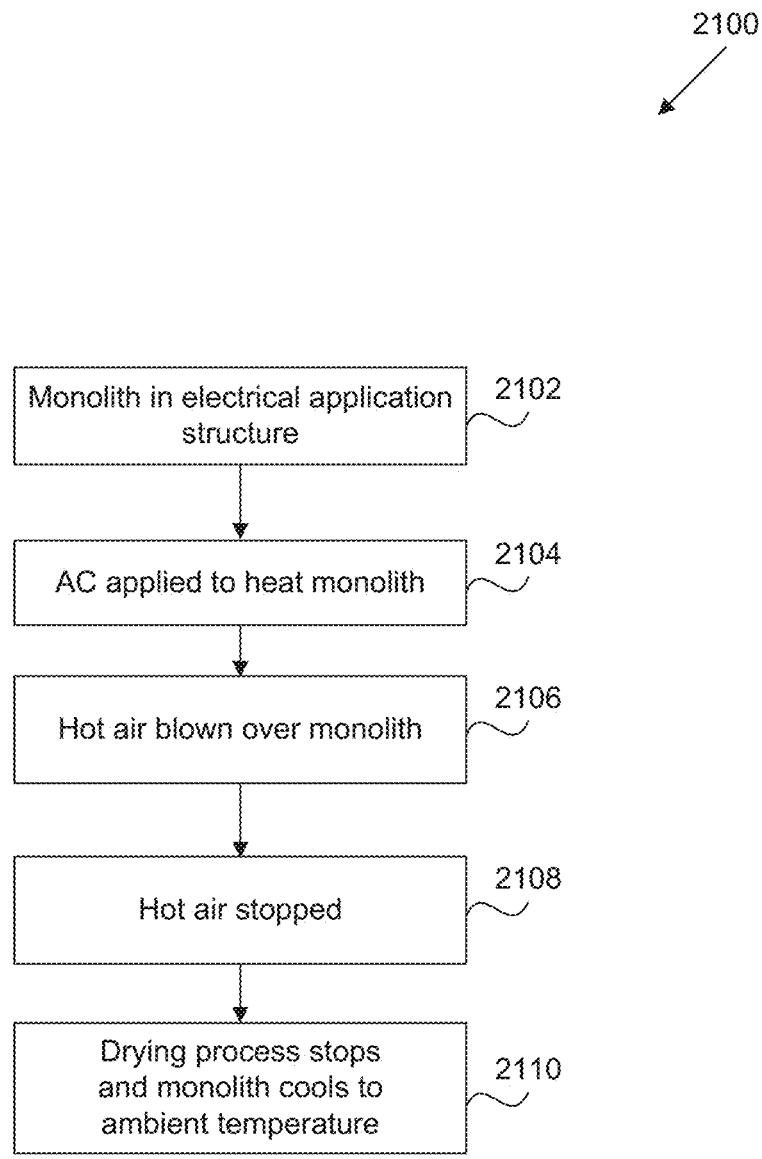
FIG. 21 illustrates a flowchart of a method according to some embodiments.

Carbon structures can be prone to cracking during drying. However, methods described related to FIG. 21 can reduce the tendency to crack and increases the consistency of heat distribution in carbon structures when progressive Joule heating is performed. FIG. 21 illustrates a flowchart showing a method 2100 for drying monolith 212 by applying alternating current joule heating.

At step 2102, in some embodiments, soaked monolith 212 is placed in an electrical application structure. In some embodiments, the electrical application structure contains a metal plate, a foam, a carbon coated copper electrode, a carbon structure, a carbon coated copper electrode, a foam, and a metal plate. In some embodiments, the electrical application structure contains from inside to outside a metal plate, a foam, a carbon coated copper electrode, a carbon structure, a carbon coated copper electrode, a foam, and a metal plate. In some embodiments, the copper electrodes are placed on opposite sides of the carbon structure at a pressure of at least 5 lbs/in$^2$.

At step 2104, in some embodiments, monolith 212 is heated with alternating current. In some embodiments, the alternating current has a frequency in a range of about 1 Hz to about 100,000 Hz. In some embodiments, the alternating current has a frequency of about 60 Hz. In some embodiments, voltage is controlled, as the resistance of monolith changes with temperature, to maintain the current through monolith less than about 10 amps throughout the heating. In some embodiment, alternating current is applied until monolith 212 reaches 80° C.

At step 2106, in some embodiments, after monolith 212 reaches a temperature of about 80° C., remaining steam is removed from monolith 212. In some embodiments, at step 2106, hot air (e.g. about 60° C. to about 100° C.) is blown over monolith 212 to remove any steam remaining inside monolith 212. In some embodiments, the air is blown over monolith 212 until the temperature of monolith 212 is decreased to ambient temperature (e.g. about −20° C. to about 32° C.) by decreasing the temperature of the air to ambient temperature (e.g. about −20° C. to about 32° C.). In some embodiments, the temperature of monolith 212 can be measured by a thermocouple.

At step 2108, the flow of air can be stopped. In some embodiments, at step 2108, the air is blown over monolith 212 until no steam is observed leaving monolith 212. In some embodiments, at step 2108, the air is stopped after blowing for about 10 minutes to about 90 minutes.

In some embodiments, steps 2106 and 2108 are repeated until no steam is observed leaving monolith 212 at the beginning of the hot air flow. In some embodiments, steps 2106 and 2108 are repeated at least 5 times (e.g., at least 6 times). In some embodiments, steps 2106 and 2108 are repeated for about 60 minutes to about 120 minutes (e.g., about 75 minutes to about 90 minutes). In some embodiments, steps 2106 and 2018 are repeated for about 90 minutes. In some embodiments, voltage is increased to maintain the constant current amperage, as the resistance of monolith 212 increases as it dries. In some embodiments, the drying process is stopped when a pre-determined humidity level is reached. In some embodiments, humidity level in the monolith is measured by the weight of the monolith, and the drying process is stopped when about 20% to about 100% of the water weight has been removed.

At step 2110, monolith 212 can be cooled. In some embodiments, after drying, at step 2110, monolith 212 is cooled to room temperature under ambient conditions (e.g. about −20° C. to about 32° C.).

Method 2100 for drying monolith 212 described above can reduce the tendency for carbon structures to crack during the drying process and increases the consistency of heat distribution in carbon structures when progressive joule heating is performed.

System 10 can be configured to allow for continuous adsorption of carbon dioxide from fluid source 100. For example, using the heating methods described herein, monoliths 212 can cycle between a contacting mode (e.g., shown in FIG. 2A) in which carbon dioxide is adsorbed and a regeneration mode (e.g., shown in FIG. 2B) in which carbon dioxide is released from the adsorber. In some embodiments, a first portion of monoliths 212 in array 210 are in contacting mode and a second portion of monoliths 212 in array 210 are in regeneration mode.

This cycling can be accomplished, for example, by providing a reactor that alternatively seals and unseals monoliths 212. For example, reactor 200 can have one or more chambers (e.g., chambers 216 and 218), and each chamber can have one or more monoliths 212 disposed within the chamber. In some embodiments, each chamber is sealed (e.g., by closure 300) when monoliths disposed therein are in regeneration mode and unsealed when monoliths disposed therein are in contacting mode. In some embodiments, each chamber can be hermetically sealed. In some embodiments, each chamber can be hermetically sealed using vacuum pump (e.g., vacuum pump 700). In some embodiments, closure 300 can move from a first position that seals a first chamber to a second position that unseals the first chamber. In some embodiments, the second position is a position that seals a second chamber. In some embodiments, closure 300 vacuum seals chambers of reactor 200.

In some embodiments, as shown in FIG. 6, closure 300 can be a pair of doors on opposite sides of reactor 200 that each slide from a first position to a second position. FIG. 6 illustrates a reactor having two chambers, each with one monolith disposed therein. For example, as shown in FIG. 6, reactor 200 can include first chamber 216 with monolith 212a disposed therein and second chamber 218 with monolith 212b disposed therein. In the exemplary reactor 200 shown in FIG. 6, closure 300 is in the first position and first chamber 216 is sealed. In this position, monolith 212a is in regeneration mode, meaning system 10 provides electric current 602 to monolith 212a to heat monolith 212a as described above, which in turn releases carbon dioxide adsorbed by monolith 212a. At the same time, monolith 212b is in contacting mode, meaning system 10 flows fluid 102 from fluid source 100 through monolith 212b such that monolith 212b adsorbs carbon dioxide and fluid 104 (e.g., fluid 102 less carbon dioxide) flows out of reactor 200. Once system 10 detects that a certain condition has been met, for example based on time elapsed, saturation level of monolith 212b, or amount of carbon dioxide being released from monolith 212a, closure 300 or 320 may move to a second position in which second chamber 218 is sealed and first chamber 216 is unsealed. In this portion of the cycle, the operation is reversed from what is described above, for example, monolith 212a is in contacting mode and monolith 212b is in regeneration mode. In some embodiments, closure 300 can slide within tracks 206 to unseal first chamber 216 and move to a second position in which second chamber 218 is sealed.

FIG. 7 shows another exemplary arrangement of reactor 200 that follows the same contacting and regeneration cycling as the reactor shown in FIG. 6. For example, FIG. 7 shows exemplary reactor 200 with a first chamber 216 containing a first 12×6 array 210 of monoliths 212 disposed within a first chamber and a second 12×6 array of monoliths 212 disposed within a second chamber (shown sealed behind closure 300 in FIG. 7). Closure 300 shown in FIG. 7 includes a pair of sliding doors that can each slide between a first position and a second position as described above related to FIG. 6. In some embodiments, each door of closure 300 is disposed on opposite sides of the reactor. In some embodiments, when first chamber 216 or second chamber 218 is unsealed, all monoliths 212 disposed therein are in contacting mode. In some embodiments, when first chamber 216 or second chamber 218 is sealed, all monoliths 212 disposed therein are in regeneration mode.

FIG. 8 shows an exemplary arrangement of reactor 200 that includes a 10×11 array of monoliths. In some embodiments, as shown in FIG. 8, closure 300 is a box that moves from a first position (shown in FIG. 8) to a second position to seal array 210. In some embodiments, closure 300 slides along tracks 312 on frame 310 to a second position in which a contacting end 314 of closure 300 contacts sealing surface 308. In some embodiments, when closure 300 is in the first position (shown in FIG. 8), monoliths 212 are in the contacting mode. In some embodiments, when closure 300 is in the second position, monoliths 212 are in the regeneration position.

Figure 22:
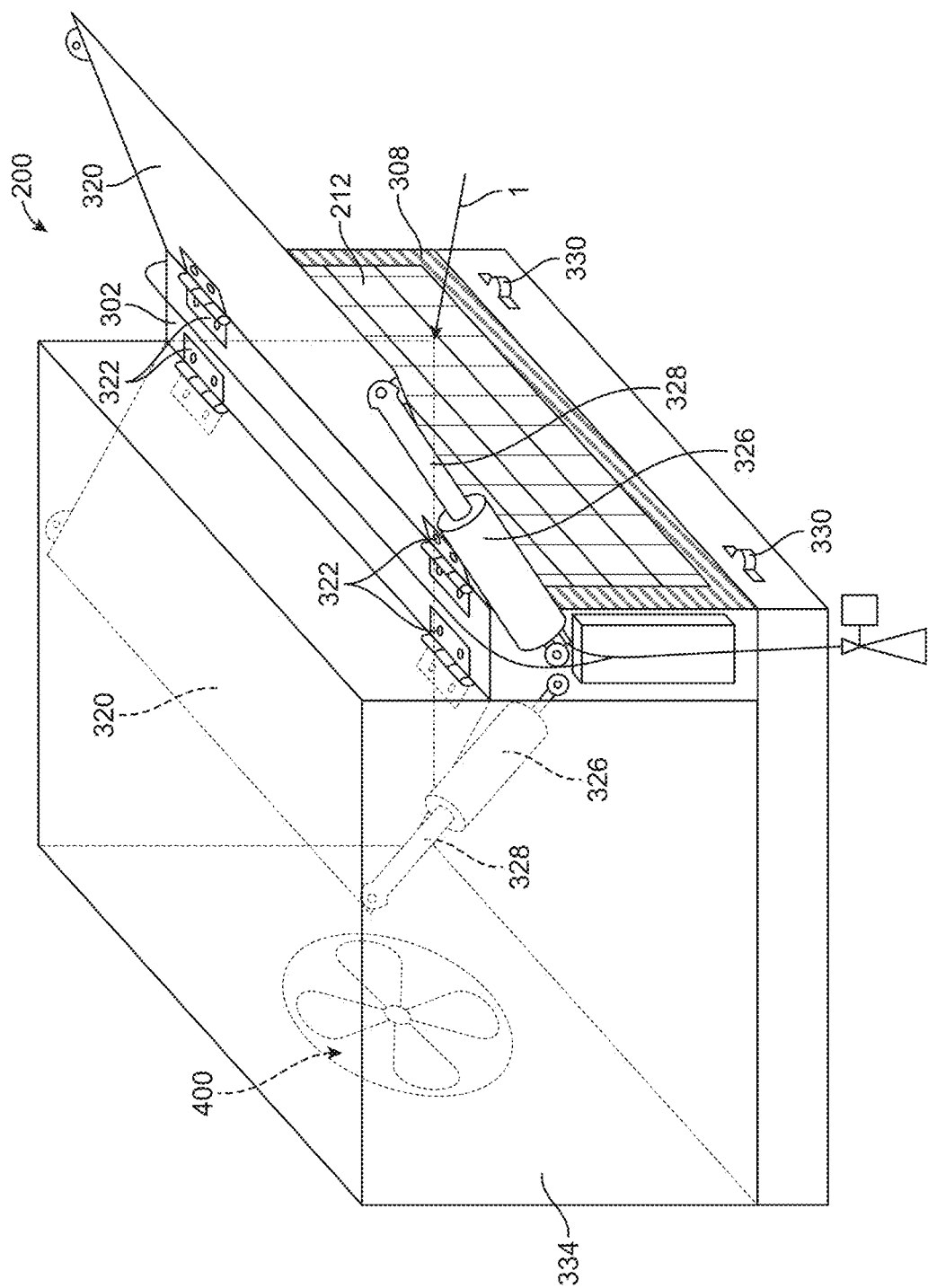
FIG. 22 illustrates a reactor according to some embodiments.
Figure 23:
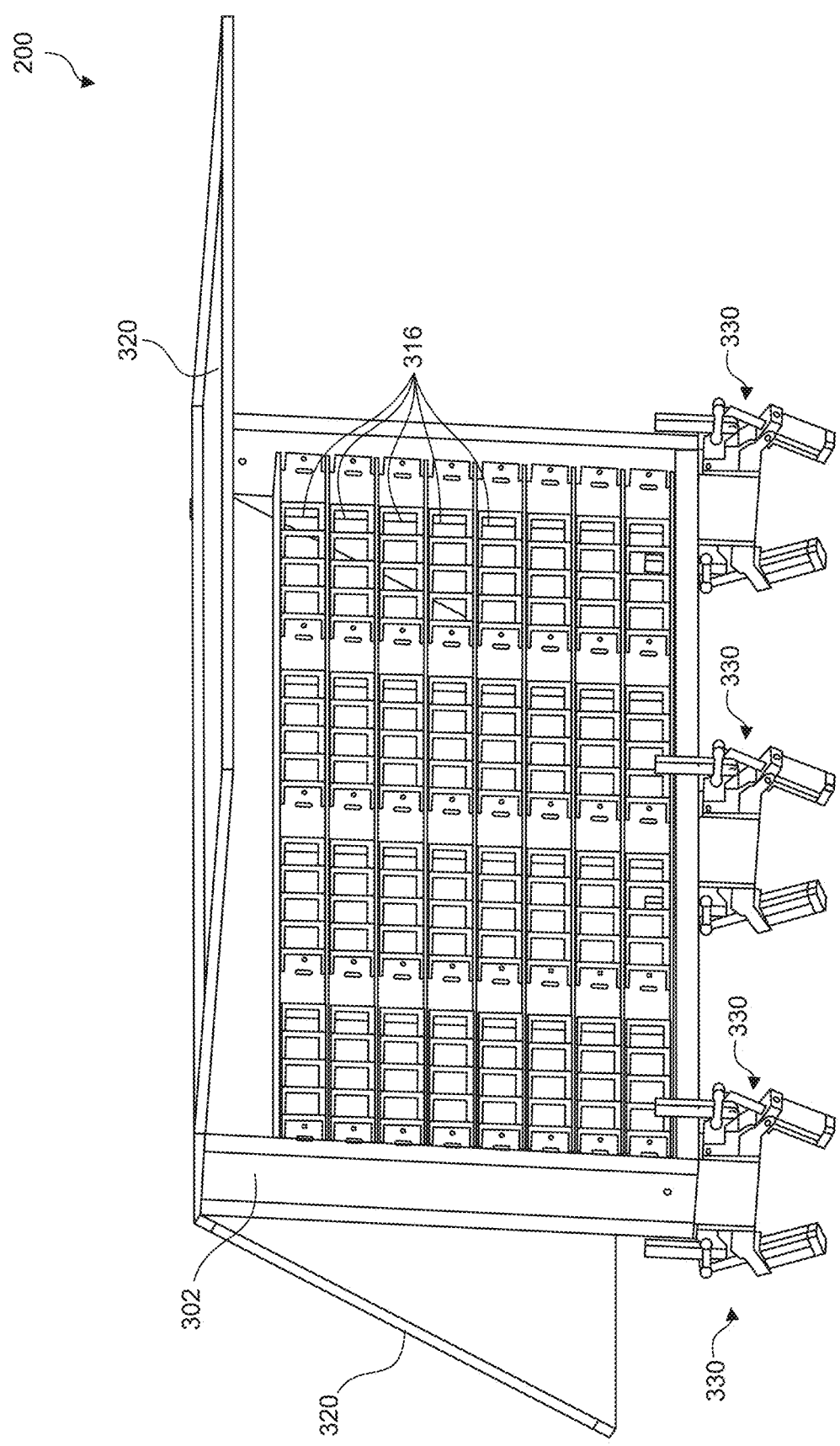
FIG. 23 illustrates a reactor according to some embodiments.

FIGS. 22 and 23 show exemplary arrangement of reactor 200 having one or more monoliths 212 disposed within housing 302 and frame 332. In some embodiments, reactor 200 includes one or more closures 320. In some embodiments, reactor 200 includes two closure 320. In some embodiments, a first closure 320 is disposed on a first side of frame 332 and a second closure 320 is disposed on a second side of frame 332 opposite the first side, as shown in FIG. 23. In some embodiments, when both closures are open, a fluid (e.g., fluid 102) can flow across monoliths 212 and reactor 200 can be in contacting mode. In some embodiments, when both closures are closed, a fluid cannot pass across monoliths 212 and reactor 200 can be in regeneration mode.

In some embodiments, closure 320 is hingedly coupled to reactor 200. In some embodiments, closure 320 is coupled to frame 332 by at least one hinge 322. In some embodiments, closure 320 is coupled to frame 332 by two hinges 322.

In some embodiments, closure 320 can be opened and closed using one or more hydraulic cylinders 324. In some embodiments, hydraulic cylinder 324 includes cylinder 326 and rod 328. Hydraulic cylinder 324 can actuate between a retracted position and an extended position. FIG. 22 illustrates hydraulic cylinder 324 in the extended position. In some embodiments, hydraulic cylinder 324 moves closure 320 from an open position (shown in FIG. 22) to a closed position. In some embodiments, in the closed position, closure 320 engages with clamps 330 on frame 332. In some embodiments, clamp 330 can be a pneumatic or hydraulic clamp. In some embodiments, clamp 330 engages with closure 320 to secure closure 320 in the closed position. In some embodiments, in the closed position, closure 320 couples to sealing surface 308 to seal reactor 200. In some embodiments, in the closed position, closure 320 is sealed under vacuum. In some embodiments, when hydraulic cylinder 324 extends, closure 320 is in the first position (shown in FIG. 22), monoliths 212 are in the contacting mode. In some embodiments, when hydraulic cylinder 324 contracts, closure 320 is in the closed position, and monoliths 212 are in the regeneration mode. In some embodiments, when hydraulic cylinder 324 extends, closure 320 is in the open position, and monoliths 212 are in the contacting mode. In some embodiments, reactor 200 can include two closures 320 on opposite sides of reactor 200. In some embodiments, reactor 200 is in contacting mode when both closures 320 are in the open position. In some embodiments, reactor 200 is in the regeneration mode when both closures 320 are in the closed position.

In some embodiments, closure 320 is flexible, which can allow closure 320 to be light and reduce material costs. In some embodiments, closure 320 can be used for about 25,000 cycles to about 500,000 cycles, about 35,000 cycles to about 400,000 cycles, about 45,000 cycles to about 250,000 cycles, about 75,000 cycles to about 150,000 cycles, or within a range having any two of these values as endpoints. In some embodiments, in the context of closure 320, one cycle includes opening closure 320 and closing closure 320.

Figure 24:
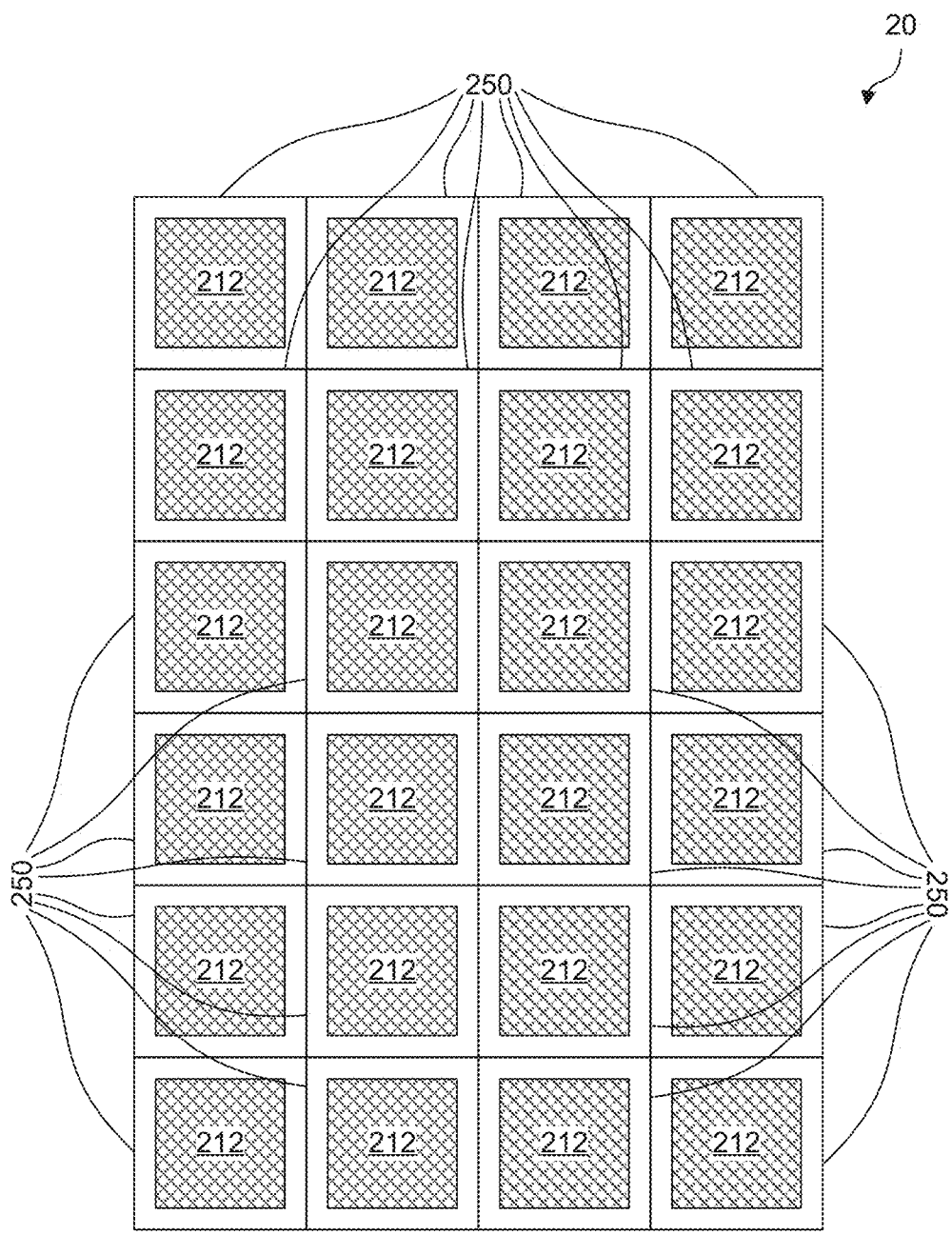
FIG. 24 illustrates a system of reactors according to some embodiments.

In some embodiments, as shown in FIG. 22, reactor 200 can be coupled to duct 334. In some embodiments, duct 334 includes fan 400 that can be used to draw fluid (e.g., fluid 102) through monoliths 212. In some embodiments, multiple reactors 200 can be coupled to the same duct. For example, as shown in FIG. 24, multiple reactors 200 can be stacked or placed side-by-side. FIG. 23 illustrates the reactor 200 of FIG. 22 that is not coupled to duct 334. an exemplary arrangement of reactor 200 that has a similar hinged closure 320 as reactor 200 shown in FIG. 22.

Closures 300 and 320 can move between a first position and a second position. In some embodiments, closure 300 is slidably coupled to a reactor (e.g., reactor 200) and slides between the first position and the second position. In some embodiments, closure 320 is hingedly coupled to a reactor (e.g., reactor 200) and rotate between the first position and the second position. In some embodiments, closure 320 is open in the first position and closed in the second position.

In some embodiments, closure 300 and closure 320 can move between the first position and the second position based on various factors, such as time elapsed in one position, amount of fluid 102 entering reactor 200, concentration of carbon dioxide in fluid 102, carbon dioxide concentration in product stream 103, or amount of carbon dioxide exiting reactor 200 through product stream 105. In some embodiments, system 10 includes solenoid 107 in line with product stream 105.

In some embodiments, closures 300 and 320 can move between the first position and the second position after closures 300 and/or 320 have been in one position for a predetermined time has elapsed. In some embodiments, the predetermined time is about 10 minutes to about 120 minutes (e.g., about 10 minutes to about 90 minutes, about 20 minutes to about 70 minutes, or about 20 minutes to about 60 minutes). In some embodiments, closures 300 and/or 320 move from a first position to a second position after a predetermined time has elapsed and then moves back to the first position after the predetermined time has elapsed again.

In some embodiments, system 10 includes one or more sensors for measuring concentration of carbon dioxide in fluid 102 and volumetric flow rate of fluid 102. In some embodiments, system 10 includes a first sensor on inlet stream 101 that measures the concentration of carbon dioxide in fluid 102. In some embodiments, system 10 includes a second sensor on inlet stream 101 to reactor 200 that measures the flow rate of fluid 102 entering reactor 200. In some embodiments, system 10 includes a single sensor on inlet stream 101 that measures both concentration of carbon dioxide in fluid 102 and the flow rate of fluid 102 entering reactor 200. In some embodiments, closures 300 and/or 320 can move between the first position and the second position based on one or more signals received from first sensor and/or second sensor. For example, in some embodiments, if system 10 determines, based on the one or more sensors, that a predetermined amount of carbon dioxide has entered reactor 200, closures 300 and/or 320 can move between the first position and the second position. In some embodiments, the predetermined amount of carbon is about 0.15 mmol to about 1.5 mmol (e.g., about 0.25 mmol to about 1 mmol or about 0.25 mmol to about 0.5 mmol) carbon dioxide per gram of monolith disposed in each chamber.

In some embodiments, system 10 includes one or more sensors disposed downstream of an outlet to reactor 200 that measures the concentration of carbon dioxide in fluid 104 at product stream 103. In some embodiments, a concentration of carbon dioxide in product stream 103 that exceeds a predetermined value can indicate that a monolith disposed within the chamber is saturated with carbon dioxide during the contacting mode. In some embodiments, if system 10 determines, based on the one or more sensors, that a concentration of carbon dioxide in product stream 103 exceeds a predetermined value, closures 300 and/or 320 can move between the first position and the second position. In some embodiments, the predetermined concentration value is about 80 wt % to 95 wt % (e.g., about 85 wt % to about 90 wt %).

In some embodiments, system 10 includes one or more sensors disposed downstream of an outlet to reactor 200 that measures the flow rate of carbon dioxide-rich stream 106 in product stream 105. In some embodiments, a flow rate of carbon dioxide-rich stream 106 that is less than a predetermined value can indicate that all or substantially all of the carbon dioxide adsorbed by monolith 212 has been released during regeneration mode. In some embodiments, if system 10 determines, based on the one or more sensors, that the flow rate of carbon dioxide-rich stream 106 is less than a predetermined value, closure 300 and/or 320 can move between the first position and the second position. In some embodiments, the predetermined flow rate value is about 10 volume % to about 0.1 volume % (e.g., about 7.5 volume % to about 2.5 volume %). In some embodiments, one or more of the sensors described above are part of carbon dioxide analyzer 502.

Figure 25:
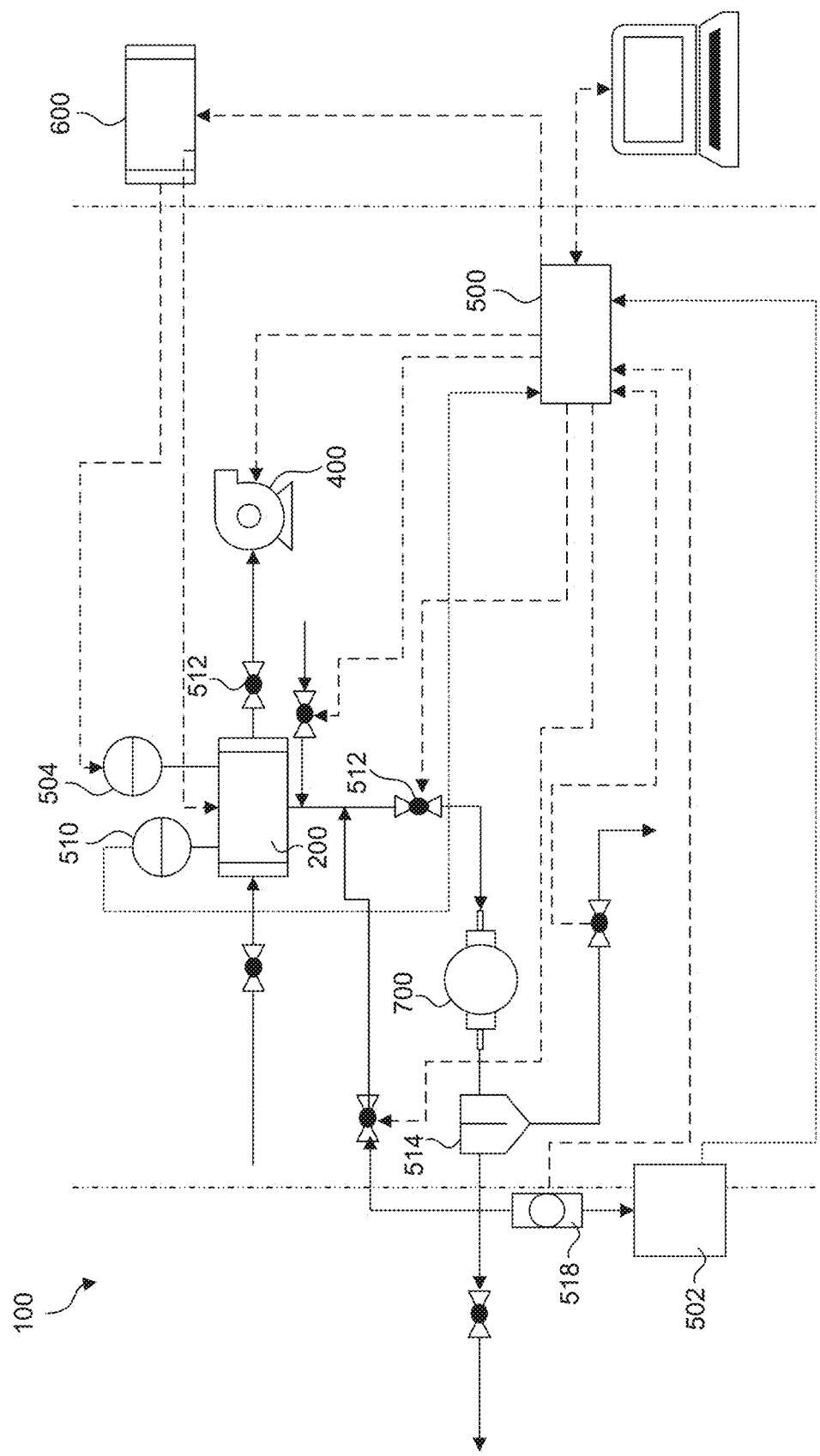
FIG. 25 illustrates a schematic of a system for extracting carbon dioxide according to some embodiments.

FIG. 25 illustrates an exemplary schematic of system 10 according to some embodiments. In some embodiments, system 10 includes reactor 200, fan 400, pressure controller 500, power source 600, and vacuum pump 700. System 10 can include a control system that includes controller 500, carbon dioxide analyzer 502, temperature sensor 504, velocity sensors 506, timer 508, pressure sensors 510, valves 512, separator 514, and flow meter 518.

In some embodiments, fan 400 draws fluid through reactor 200 during contacting process. In some embodiments, vacuum pump 700 starts to vacuum reactor 200 after closure 300 and/or 320 is sealed. In some embodiments, pressure sensor 510 measures the pressure within the sealed chamber of reactor 200. In some embodiments, the output from pressure sensor 510 indicates whether the sealed chamber of reactor 200 has reached a vacuum condition and is used to determine when the regeneration process can begin. In some embodiments, pressure sensor 510 is a transducer coupled to reactor 200.

In some embodiments, when the regeneration process begins, power source 600 supplies power to reactor 200 (or modular unit 250). In some embodiments, temperature sensor 504 measures the temperature within the sealed chamber of reactor 200, and the output from temperature sensor 504 is used to determine the duration of power-on and power-off of power source 600. In some embodiments, temperature sensor 504 is an NTC thermistor. For example, in some embodiments, when temperature sensor 504 detects the temperature within the sealed chamber falls below a minimum temperature, power source 600 is turned on, and when temperature sensor 504 detects the temperature within the sealed chamber exceeds a maximum temperature, power source 600 is turned off. In some embodiments, the minimum temperature is about 80° C. and the maximum temperature is about 200° C. In some embodiments, temperature sensor 504 measures the temperature continuously during the regeneration process.

In some embodiments, during the regeneration process, second product stream 105 is fed through water separator 514 to separate water from carbon dioxide-rich stream 106 released from reactor 200. In some embodiments, flow meter 518 measures the flowrate of carbon dioxide-rich stream 106, and the output of flow meter 518 is used to determine when power source 600 can be turned off. In some embodiments, carbon dioxide analyzer 502 measures the carbon dioxide concentration of carbon dioxide-rich stream 106, and the output of carbon dioxide analyzer 502 is used to determine when power source 600 can be turned off.

In some embodiments, solenoid valves 512 gate the chamber of reactor 200 to fan 400 and vacuum pump 700. In some embodiments, solenoid valves 512 controls the sealing and venting of the chamber of reactor 200. In some embodiments, solenoid valves 512 are controlled by controller 500.

In some embodiments, monoliths 212 disclosed herein have a life of about 1 month to about 1 year. In some embodiments, monolith 212 disclosed herein can have a life of about 100 cycles to about 5000 cycles (e.g., about 500 cycles to about 3000 cycles or about 1000 cycles to about 2000 cycles). In some embodiments, one cycle is one occurrence of the contacting mode and one occurrence of the regeneration model. In some embodiments, a cycle may begin with either the contacting mode or the regeneration mode.

Figure 9:
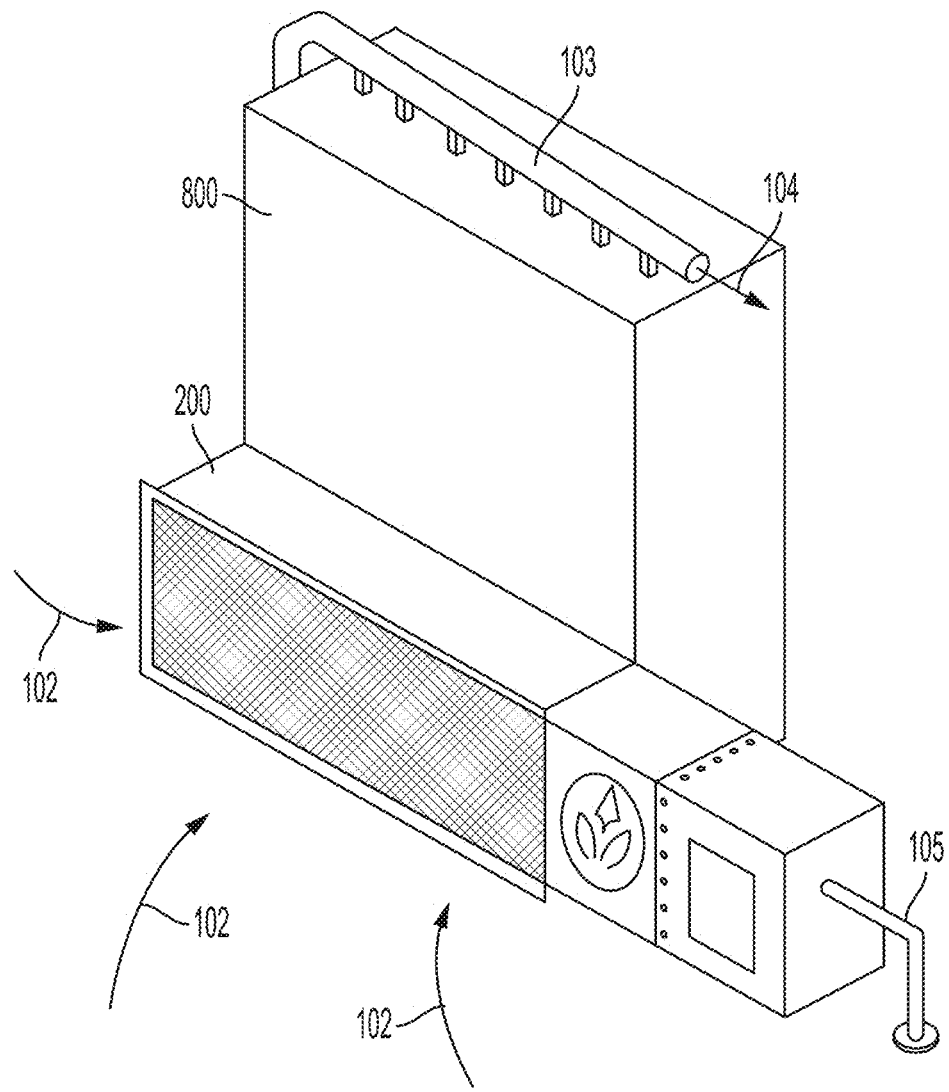
FIG. 9 illustrates a reactor according to some embodiments used with a cooling tower according to some embodiments.
Figure 10:
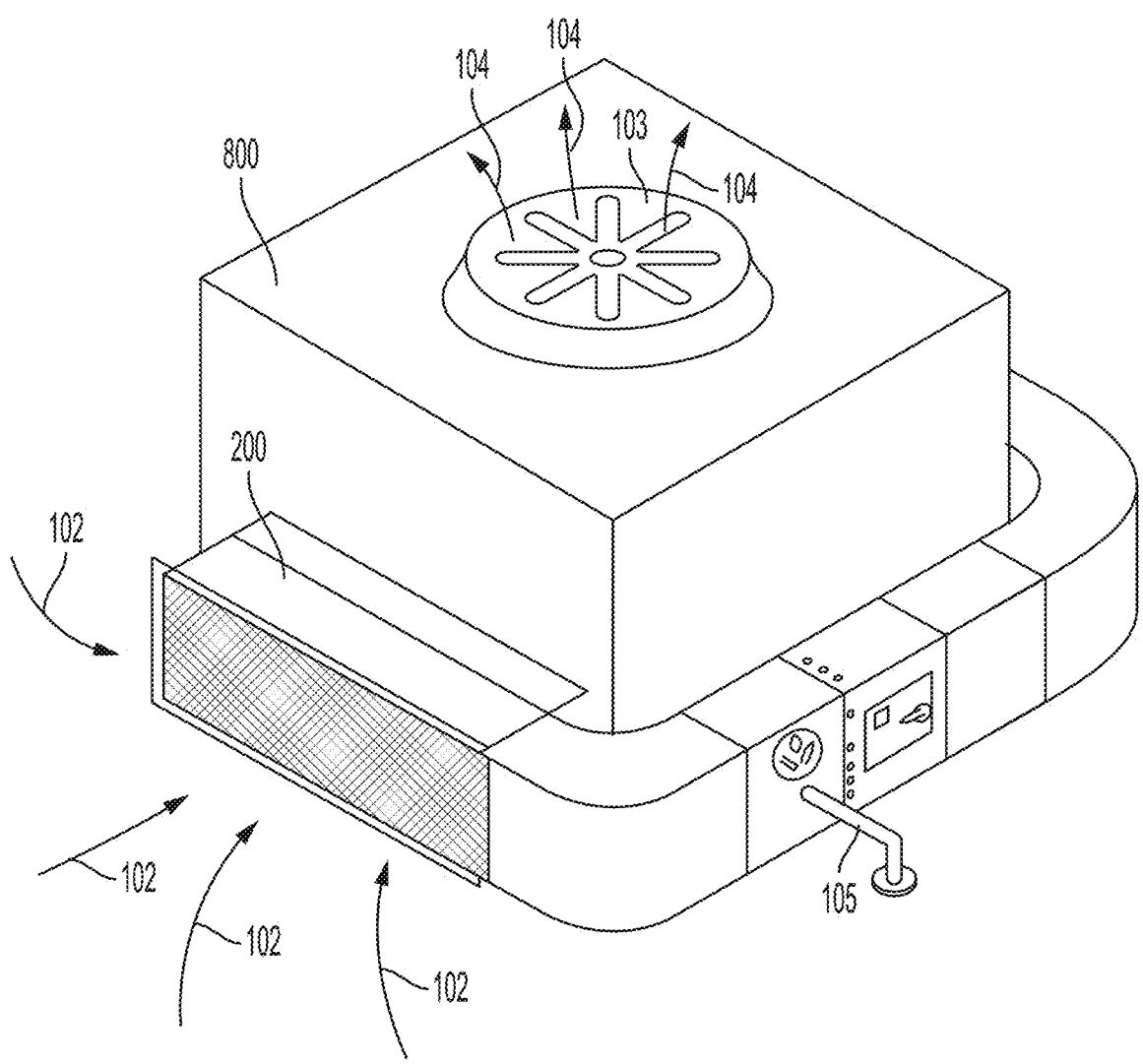
FIG. 10 illustrates a reactor according to some embodiments used with a cooling tower according to some embodiments.

FIGS. 9 and 10 show exemplary reactors (reactor 200) integrated with cooling towers according to some embodiments. Cooling towers (e.g., cooling tower 800) draw hot air out of systems, such as refrigeration systems, HVAC systems, or industrial processes. Hot air enters cooling tower 800 at an inlet. In some embodiments, reactor 200 can be integrated into a cooling tower at the inlet of the cooling tower such that fluid 102 (e.g., ambient air) is drawn through reactor 200 before entering cooling tower 800. As such, integrating reactor 200 with cooling tower 800 efficiently uses the fluid flow created by cooling tower 800, which can reduce the power required by system 10. Additionally, flowing fluid 102 through reactor 200 does not have a significant effect on the performance of cooling tower 800.

In some embodiments, as shown in FIG. 9, cooling tower 800 can be a one-sided inlet cooling tower. In some embodiments, as shown in FIG. 10, cooling tower 800 can be a two-sided cooling tower (e.g., a cooling tower with more than one inlet) with two or more inlets and a reactor 200 at each inlet. In some embodiments, cooling tower 800 includes more than one inlet and reactor 200 is attached to every inlet of cooling tower 800. In some embodiments, reactor 200 is a modular design with multiple chambers connected together, such that it can be used with cooling towers of different shapes and scales.

In some embodiments, extracted carbon dioxide exits reactor 200 as carbon-dioxide rich stream 106 and does not enter cooling tower 800. In some embodiments, fluid 104 (e.g., fluid 102 less carbon dioxide) exits reactor 200 and enters cooling tower 800 to act as cooling media. In some embodiments, the pressure drop across reactor 200 is small enough that it does not impact operation of the cooling tower. In some embodiments, the pressure drop is in a range of 0.2 inches of water column to 1.1 inches of water column, 0.4 inches of water column to 0.7 inches of water column, or 0.5 inches of water column. In some embodiments, the cooling performance of fluid less carbon dioxide 104 is reduced less than 5% comparing to the cooling performance of fluid 102, if it does not pass through reactor 200.

In some embodiments, reactor 200 is not attached to cooling tower 800 but instead draws fluid 102 directly from the environment. In some embodiments, reactor 200 is a modular unit that can be assembled into a modular system 20. Modular system 20 can include two or more modular units 250. In some embodiments, modular units 250 can be stacked vertically, disposed horizontally, or arranged in an array (e.g., as shown in FIG. 24). In some embodiments, each modular unit 250 includes all components of reactor 200 described. In some embodiments, modular unit 250 includes a reactor 200 with a closure 300 that slides (e.g., as illustrated in FIG. 6). In some embodiments, modular unit 250 includes a reactor 200 with a closure 320 that is hingedly coupled to reactor 250 (e.g., as illustrated in FIG. 22). In some embodiments, modular system 20 can include some modular units 250 with closures 300 and some modular units 250 with closures 320.

Modular system 20 can include 2 or more modular units 250. In some embodiments, modular system 20 can include from 2 to 600,000 modular units 250. In some embodiments, the number of modular units 250 in modular system 20 is in a range from about 100 to about 550,000, from about 1000 to about 500,000, from about 5000 to about 450,000, from about 10,000 to about 400,000, from about 50,000 to about 300,000, from about 100,000 to about 200,000, or within a range having any two of these values as endpoints. In some embodiments, modular units 250 are arranged in an array having dimensions m×n (i.e., m columns of modular units 250 and n rows of modular units 250), where m is an integer from 1 to 1000 and n is an integer from 1 to 1000. FIG. 24 illustrates a modular system 20 with 24 modular units 250. As shown in FIG. 24, m=4 and n=6. The number of modular units 250 can be determined based on the needs of a specific site. A benefit to the modular units 250 is that a modular system 20 can be scaled up or down as needed. In some embodiments, each modular unit 250 is removably coupled to the modular system 20 and/or to another modular unit 250. For example, a first modular unit 250 can be removably coupled to a second modular unit 250. In some embodiments, each modular unit 250 is removably coupled to a frame configured to accommodate numerous modular unit 250. In some embodiments, modular units 250 can be coupled to the system (e.g., system 20) using fasteners (e.g., screws and nuts). Modular units can be replaced by disconnecting components such as piping and instrumentation connections, removing fasteners, and lifting out of the cluster of modules.

In some embodiments, each modular unit 250 is coupled to a duct (e.g., duct 334) through which air flows after passing over monolith 212. In some embodiments, each modular unit 250 is coupled to a separate duct. In some embodiments, more than one modular unit 250 is coupled to the same duct. In some embodiments, all modular units 250 within modular system 20 are coupled to the same duct. In some embodiments, duct 334 includes a fan (e.g., fan 400) that draws air from the environment, through each modular unit 250, and into duct 334.

Figure 26:
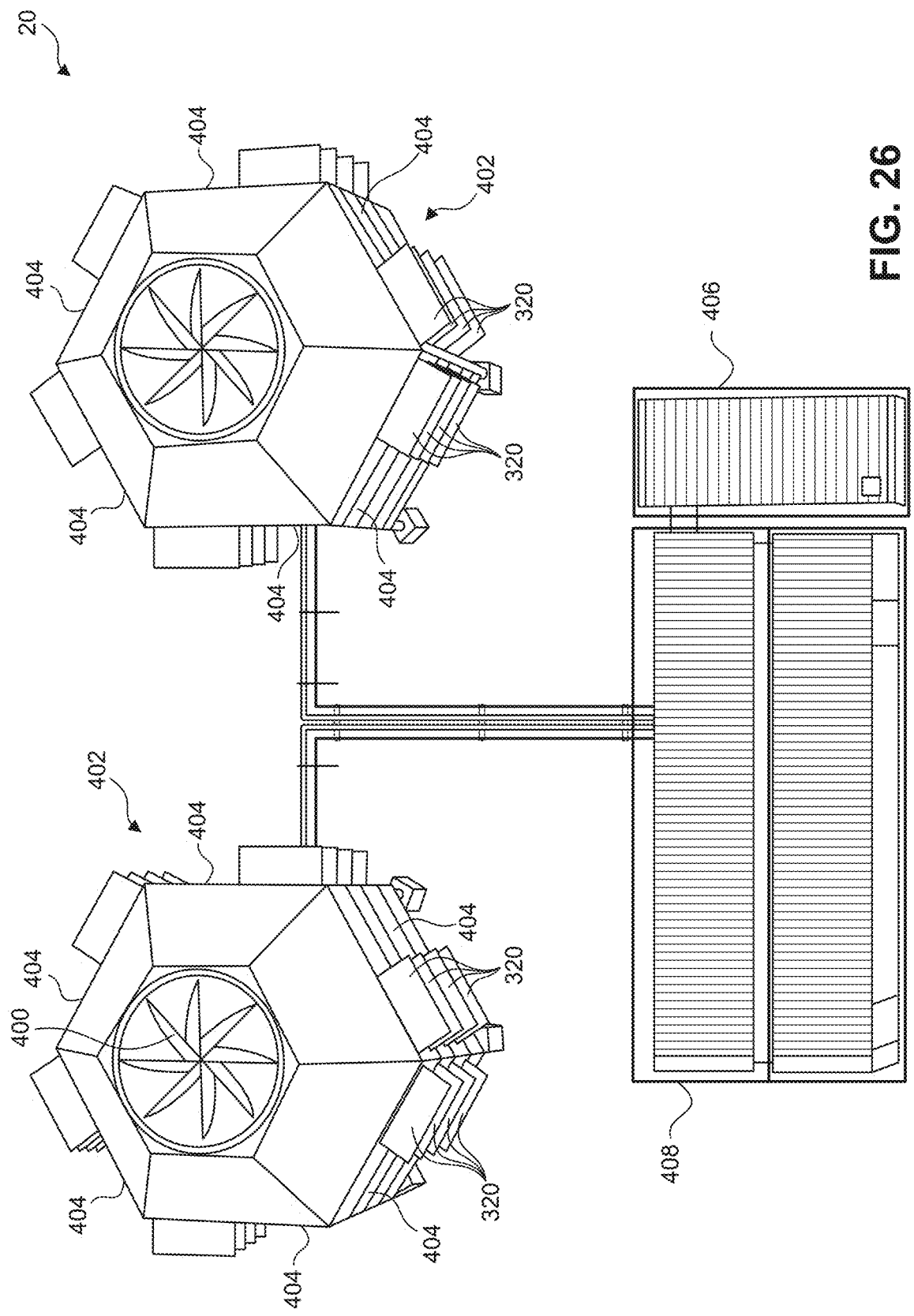
FIG. 26 illustrates a system of reactors according to some embodiments.
Figure 27:
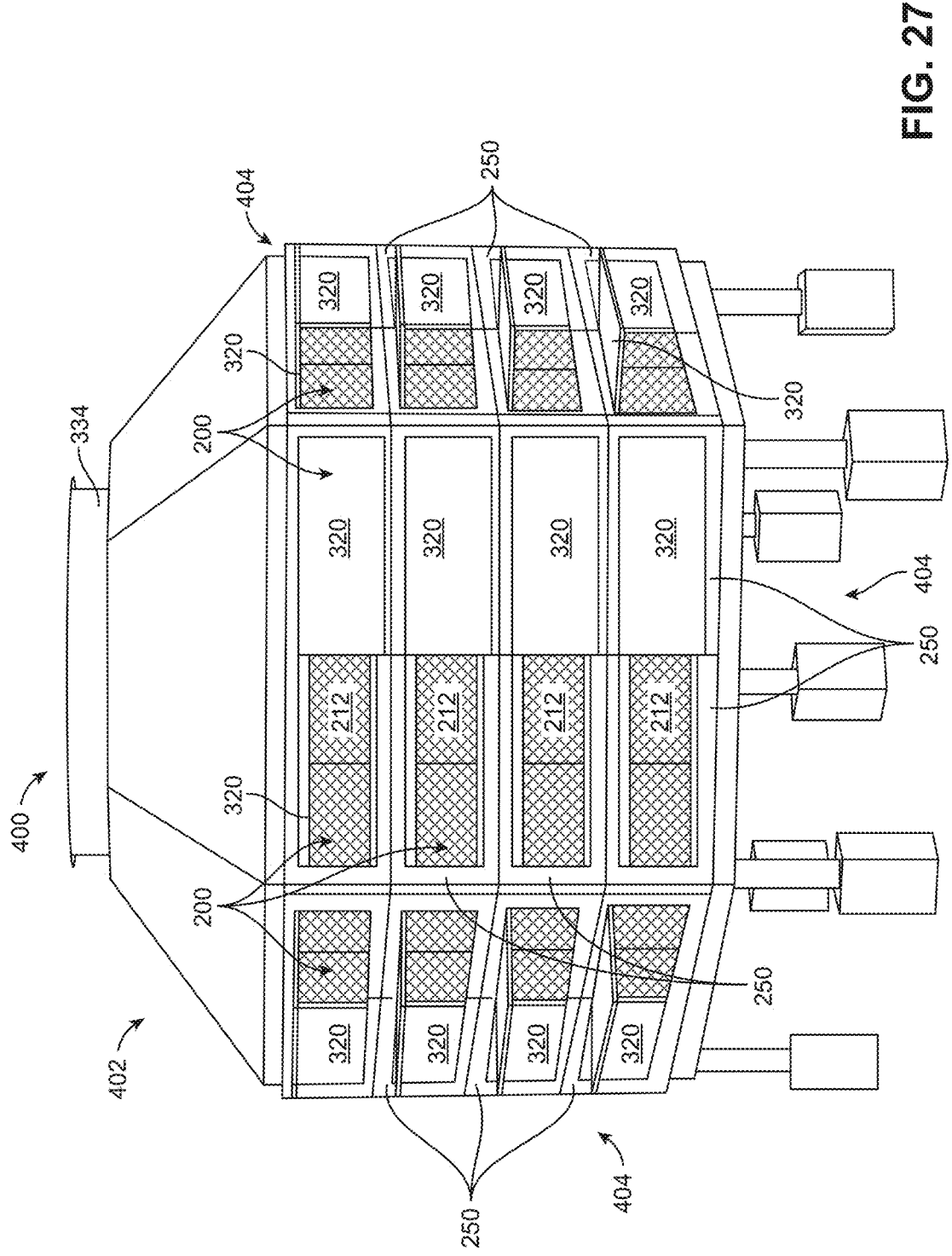
FIG. 27 illustrates a system of reactors according to some embodiments.

Modular system 20 can take various forms. For example, as shown in FIGS. 26 and 27, modular system 20 can include tower 402 with walls 404 of modular units 250. As shown in FIG. 26, each wall 404 can include 2 or more (e.g., 3 or more, 4 or more, 5 or more, 6 or more, 7 or more, 8 or more, 9 or more, or 10 or more) modular units 250. In some embodiments, as shown in FIGS. 26 and 27, six walls 404 of modular units 250 can be arranged to form a hexagonal shape when viewed top-down. It is to be understood that different numbers of walls 404 could be used to form differently shaped towers 402. In some embodiments, the number of walls 404 is equal to the number of sides of tower 402. For example, three walls 404 can be arranged to form a triangular shape when viewed top-down; four walls 404 can be arranged to form a quadrilateral (e.g., a square or a rectangle) when viewed top-down; five walls 404 can be arranged to form a pentagon when viewed top-down; seven walls 404 can be arranged to form a heptagon; or 8 walls can be arranged to form an octagon. In some embodiments, tower 402 includes n walls 404 arranged to form a shape having n sides when tower 402 is viewed top-down, where n is an integer from 4 to 100 . . . . Modular units 250 are assembled into reactor towers 402.

In some embodiments, outer sides of walls 404 define outer sides of tower 402. In some embodiments, inner sides of walls 404 define a duct (e.g., duct 334). In some embodiments, reactor tower 402 includes fan 400 to draw fluid through each of modular units 250 and into duct 334. In some embodiments, reactor tower 402 includes a single fan 402. In some embodiments, reactor tower 402 includes multiple fans (e.g., 2 or more fans, 3 or more fans, 5 or more fans, or 10 or more fans).

In some embodiments, tower 402 sits on a substrate (e.g., on the ground, on a concrete pad, or on a rooftop). In some embodiments, tower 402 is elevated above the substrate. In some embodiments, reactor tower 402 includes supports 412 to elevate reactor tower 402. In some embodiments, supports 412 stabilize reactor tower 402. Systems disclosed herein can have any number of reactor towers 402, depending on the site and conditions of the environment. In some embodiments, systems disclosed herein can include 1 or more reactor towers 402 (e.g., 2 or more reactor towers, 3 or more reactor towers, 5 or more reactor towers, 10 or more reactor towers). In some embodiments, system 20 includes two reactor towers 402, as shown in FIG. 26.

In some embodiments, system 20 includes electrical and control unit 406 coupled to reactor tower 402. In some embodiments, site 20 includes carbon dioxide purification unit 408 connected to reactor tower.

In some embodiments, modular units 250 can be manufactured from sheet metal. In some embodiments, modular units 250 can be manufactured from sheet metal have a size of, for example, 4 ft×10 ft or 4 ft×8 ft. In some embodiments, modular units 250 are sized to increase shipping efficiency. In some embodiments, each modular unit 250 can be transported by standard shipping means (e.g., a semi-trailer, train, shipping container, etc.).

Systems (e.g., system 10) disclosed herein include various electrical systems to operate, monitor, and adjust the systems. Electrical systems can include, for example, power sources that provide electricity to the systems; electrical conduits (e.g., electrodes 220) for supplying electricity to monoliths for heating; and sensors for monitoring temperature of the monoliths, saturation level of monoliths, fluid composition of fluid entering system 10, and amount of carbon dioxide exiting system 10.

In some embodiments, one or more electrodes (e.g., electrodes 220) are coupled to monolith 212. In some embodiments, electrodes 220 are electrically coupled to a source of electricity (e.g., power source 600). In some embodiments, as shown in FIG. 5, four electrodes may be used on four different sides of monolith 212. In some embodiments, as shown in FIG. 5, system 10 can include switch 604 that switches current from one electrode 220 on a first side of monolith 212 to another electrode 220 that is coupled to a second side of monolith 212 that is perpendicular to the second side. In some embodiments, when switch 604 switches between electrodes 220 as shown in FIG. 5, electric current 602 can pass through monolith 212 in an alternating fashion between horizontal and vertical. This configuration increases homogeneity of temperature within monolith 212 as it is headed.

Figure 28:
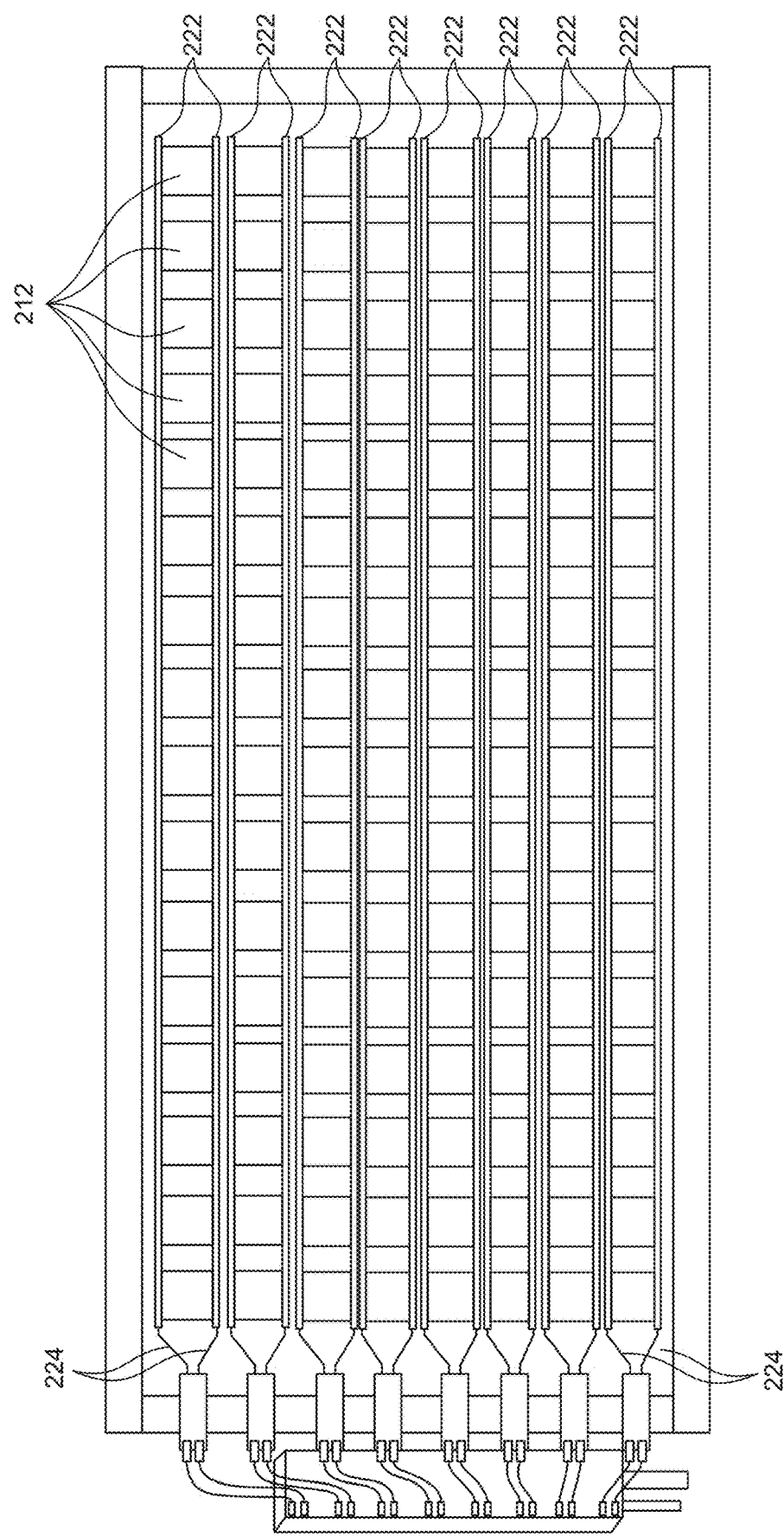
FIG. 28 illustrates an array of monoliths connected in series according to some embodiments.
Figure 29:
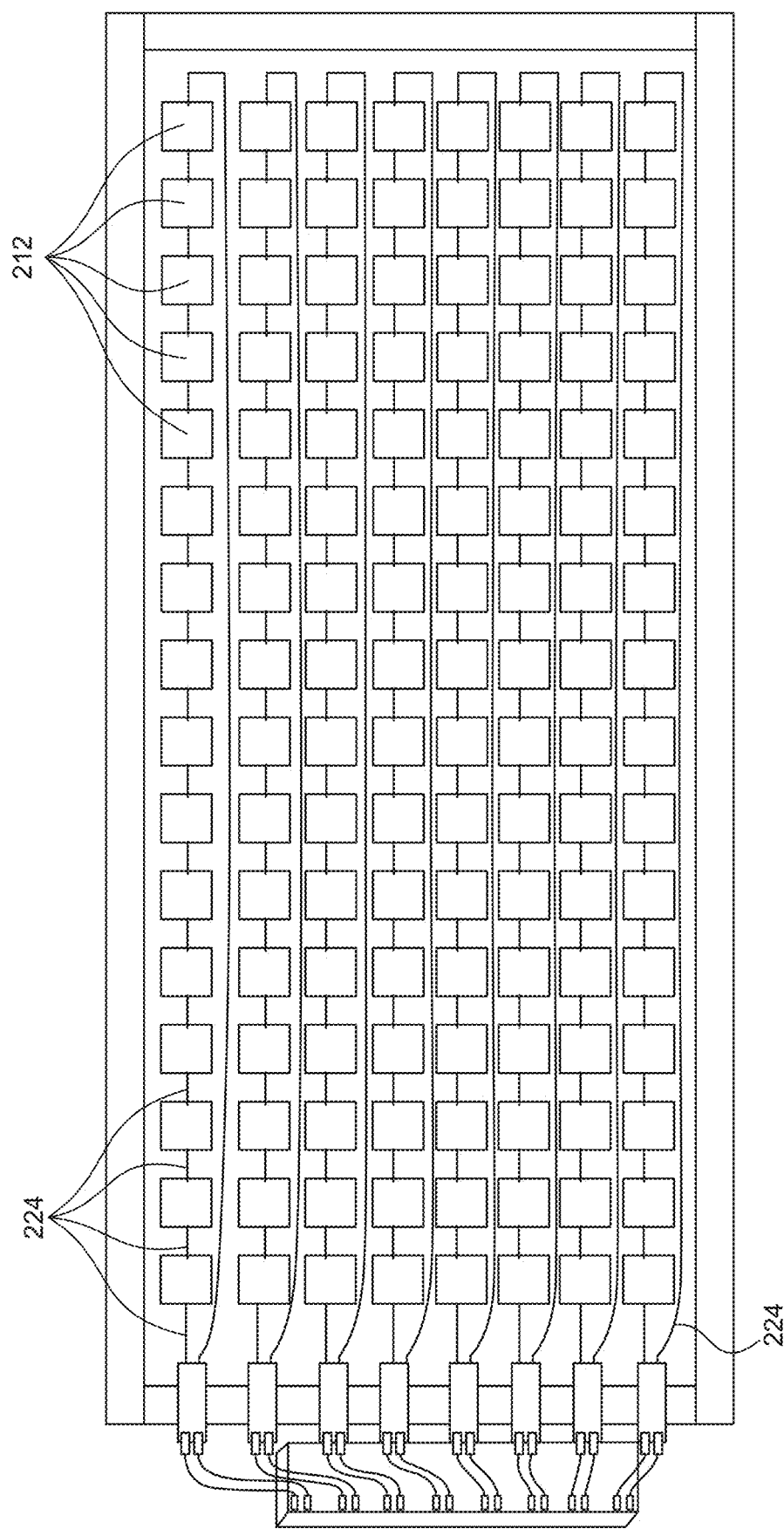
FIG. 29 illustrates an array of monoliths connected in parallel according to some embodiments.

FIG. 13 illustrates an electrical system of system 10 according to some embodiments. In some embodiments, system 10 can include 1 or more (e.g., 2 or more, 3 or more, 4 or more, or 5 or more) power sources 600. In some embodiments, as shown in FIG. 13, system 10 can include one power source per array 210 of monoliths 212. In some embodiments, the ratio of the number of power sources 600 to the number of monoliths 212 is 1:100 to about 1:1 (e.g., about 1:50 to about 1:5 or about 1:30 to about 1:10). As discussed above, chambers containing monoliths can be hermetically sealed. FIG. 13 illustrates feedthrough lines 606 that can be used to pass electric current 602 and sensor signals in and out of sealed chambers. in this configuration there are multiple monoliths sharing electric leads. This allows for power of multiple. In some embodiments, as shown in FIGS. 3 and 28, multiple series of monoliths 212 can be arranged in parallel, with electrodes 220 disposed between each series of monoliths 212. In some embodiments, in the parallel arrangement, the power distribution is low voltage and high current. In some embodiments, as shown in FIGS. 3 and 28, electrical leads can be physically connected to power multiple columns at the same time. In some embodiments, as shown in FIG. 29, power is distributed to monoliths 212 in series. In some embodiments, in the series arrangement, the power distribution is high voltage and low current.

In some embodiments, each power source (e.g., power source 600) is configured to provide a consistent direct current voltage to monoliths 212 or arrays 210 of monoliths 212. In some embodiments, power source 600 provides a direct current (e.g., electric current 602) having a voltage of about 12 volts to about 90 volts (e.g., about 30 volts to about 80 volts or about 50 volts to about 70 volts). In some embodiments, power source 600 provides a direct current having a voltage of about 50 volts. As discussed above, electrodes 220 can be adhered to monolith 212. In some embodiments, the adhesive is selected such that that the connection between the monolith and the electrode is less resistive per unit length than the monolith itself. This ensures that joule heating is the main source of heat.

In some embodiments, regeneration of carbon dioxide in monoliths (e.g., monoliths 212) is driven by heating monoliths with direct ohmic heating also known as joule heating. In some embodiments, monoliths 212 are arranged as loads in a series-parallel arrangement in order to maximize power supply efficiency and efficacy. In some embodiments, each power source (e.g., power source 600) is transformed from 3-phase grid alternate current mains to direct current, and then inverted back into single phase alternate current. Through power switches, each single phase alternate current is connected to a series of monoliths 212 either in parallel connection (FIG. 29) or series connection (FIG. 28). In some embodiments, each output is connected to a series-parallel string of monoliths, and each string of monoliths is filled with monoliths of similar DC resistance. In some embodiments, the 3-phase power includes a variable DC rail, an AC inverter, and a control unit. In some embodiments, the variable DC rail operates at 20 Volts direct current ("VDC") to 105 VDC and can produce greater than 12 kW at 105 VDC. In some embodiments, the AC inverter operates at a frequency of 100 kHz and can produce 12 kW. In some embodiments, the series-parallel string of monoliths can includes 2 or more (e.g., 4 or more, 6 or more, 8 or more, or 10 or more) rows of monoliths 212, and the monoliths 212 can be arranged in series. Each row can be arranged parallel to the next.

Figure 14A:
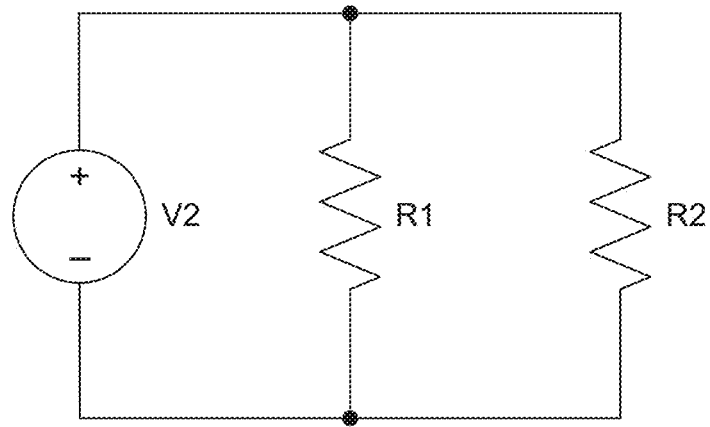
FIG. 14A illustrates an electrical system for monoliths configured in parallel.
Figure 14B:
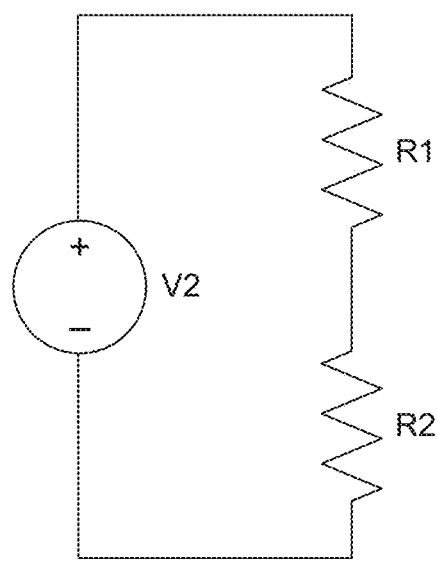
FIG. 14B illustrates an electrical system for monoliths configured in series.

One factor that affects the efficiency of the system is the resistance of the monoliths used in the system. In some embodiments, the resistance of the monoliths is designed to ensure relatively even heating throughout the array 210 of monoliths 212. If the circuit is designed such that the monoliths are in parallel, as illustrated in FIG. 14A, the voltage across each monolith will be constant, but the current and, therefore, the heating power will vary inversely with the resistance of each monolith. For example, in a two-monolith system with monoliths (represented by R1 and R2) in parallel, as shown in FIG. 14A, if a constant direct current voltage is applied across the monoliths, monolith R2 will have a resistance 2 times that of R1, meaning the heating power applied to R1 will be 2 times that of R2. If the circuit is designed such that the monoliths are set in series, as shown in FIG. 14B, the opposite will occur. For example, the current across both monoliths will be constant, but the voltage across R2 will be twice the voltage across R1, and therefore the heating power through R2 will be twice that across R1.

Equation 1 below shows the relationship between heat (Q), mass (m), specific heat capacity ($c_p$), and temperature (T). Based on Equation 1 below, two monoliths with the same masses and specific heat capacities that are being heated will increase in temperature in direct relation to the amount of heating energy (e.g., electrical energy provided by electric current 602) moving through each of the monoliths.

$$Q = m\, c_p \Delta T \qquad \text{Eq. 1}$$

As described above, the heating energy is impacted by the electrical resistance of each monolith. In some embodiments, the resistances across impregnated monoliths according to some embodiments (e.g., monoliths 212) varies in the range of 5 ohms to 5,000,000 ohms. Accordingly, systems disclosed herein may be designed for resistance balancing. In some embodiments, the resistance range for monoliths being powered by a single power supply will is in a range of ±20% of the target range. In some embodiments, monoliths in parallel have a resistance range of ±100 ohms of the target range.

In some embodiments, resistivity for a monolith having dimensions of 4 inches cubed with 100 cells per square inch will be about 2.0 Ohm to about 40.0 Ohms, including the resistivity of any adhesive used to connect electrodes to the monolith. In some embodiments, the resistivity is measured perpendicular to the flow of fluid (e.g., fluid 102). In some embodiments, the resistivity of monolith 212 is directly related to the width of monolith 212 as measured from one electrode surface to the other electrode surface on the opposite side. In some embodiments, the resistivity of monolith 212 also changes according to the water concentration or carbon dioxide amount of monolith 212.

As discussed above, systems disclosed herein offer benefits of carbon dioxide capture and rapid regeneration in an energy efficient manner. In some embodiments, system 10 uses about 10 Joules to about 200 Joules per monolith per regeneration cycle.

In some embodiments, when system 10 is integrated with a cooling tower (e.g., cooling tower 800), system 10 can remove between about 10 kg and about 10 tons of carbon dioxide per day (e.g., about 500 kg to about 3 tons of carbon dioxide per day). In some embodiments, system 10 can remove about 20% to about 85% (e.g., about 40% to about 70%) of carbon dioxide from fluid 102.

In some embodiments, system 10 can be integrated into a system that includes reactor 200, cooling tower 800, and a sequestration system that permanently removes the carbon dioxide from the atmosphere.

Figure 15:
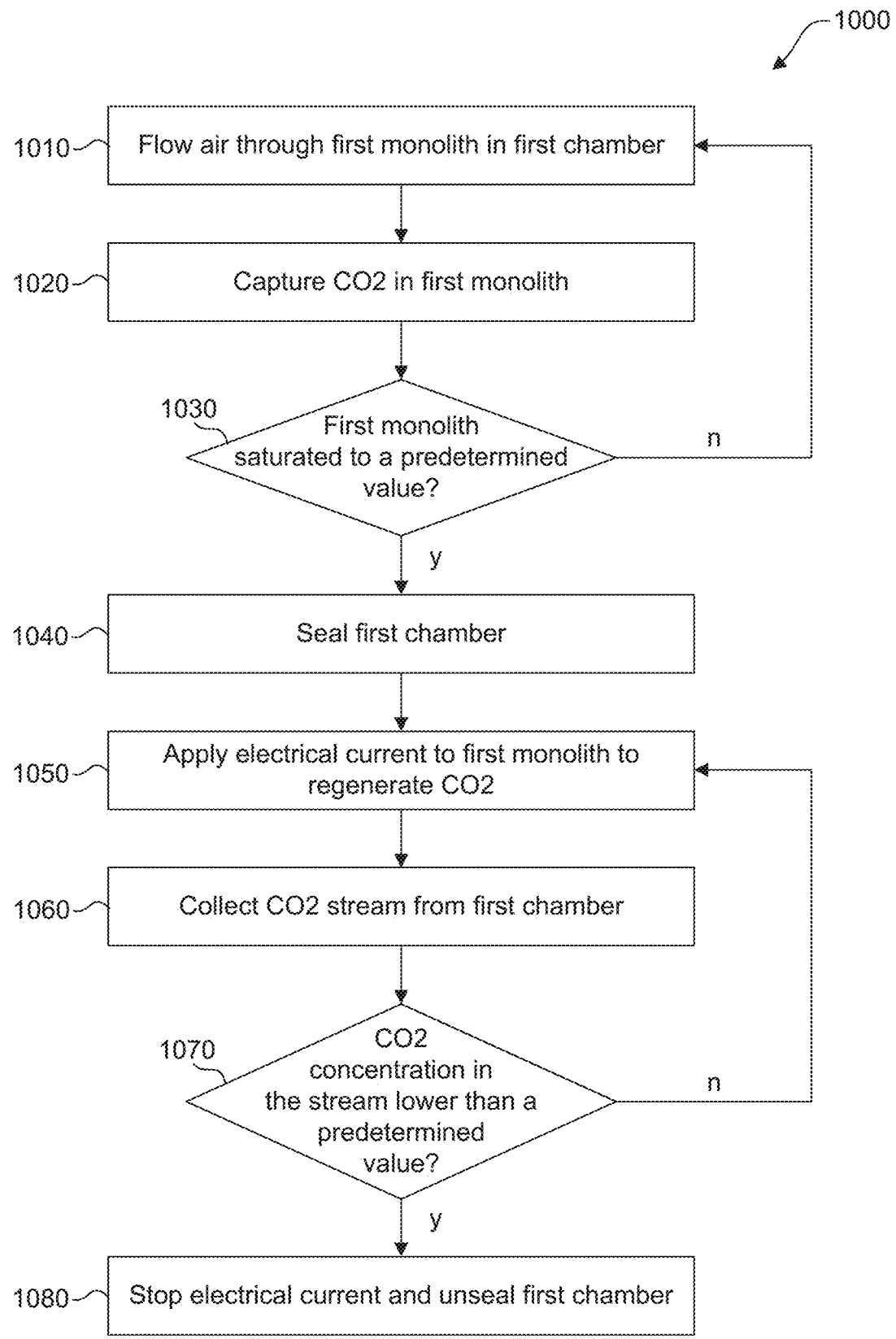
FIG. 15 illustrates a method for extracting carbon dioxide according to some embodiments.

FIG. 15 shows method 1000 of operating reactor 200 according to some embodiments. In some embodiments, at step 1010 fluid 102 flows through monolith 212 disposed in first chamber 216. In some embodiments, at step 1020, fluid 102 contacts monolith 212 such that carbon dioxide in fluid 102 is adsorbed by monolith 212. In some embodiments, at step 1030 system 10 determines whether monolith 212 is saturated with carbon dioxide to a predetermined value. In some embodiments, the predetermined saturation value is in a range of 50% to 100% (e.g., 60% to 100%, 75% to 100%, or 90% to 100%). In some embodiments, the saturation value can be determined by the weight of monolith 212. In some embodiments, the saturation value can be determined by monitoring the carbon dioxide concentration of fluid 102 that enters reactor 200 and the carbon dioxide concentration of fluid 104 that exists reactor 200.

In some embodiments, if monolith 212 is not saturated to the predetermined value, system continues steps 1010, 1020, and 1030 until system 10 determines that monolith 212 is saturated. In some embodiments, if monolith 212 is saturated to the predetermined value, system 10 moves to step 1040 and seals first chamber 216. In some embodiments, as discussed in detail above, the sealing first chamber 216 is done by sliding closure 300 to engage with sealing surface 308. In some embodiments, at step 1040, first chamber 216 is hermetically sealed. In some embodiments, first chamber 216 is sealed by vacuum pump 700. In some embodiments, at step 1050 electric current (e.g., electric current 602) is applied to monolith 212 to release adsorbed carbon dioxide. In some embodiments, the electric current is applies through electrode 220 attached to a surface of monolith 212. In some embodiments, at step 1060 the released carbon dioxide is collected downstream of reactor 200. In some embodiments, at step 1060, the collected carbon dioxide is released from system 10, for example through carbon dioxide-rich stream 106.

In some embodiments, at step 1070 carbon dioxide-rich stream 106 is analyzed (e.g., by analyzer 502) to determine the amount of carbon dioxide in carbon dioxide-rich stream 106. In some embodiments, if the carbon dioxide amount in carbon dioxide-rich stream 106 is not less than the predetermined value, in some embodiments, method 1000 repeats steps 1050, 1060, and 1070. In some embodiments, if the carbon dioxide amount in carbon dioxide-rich stream 106 is less than the predetermined value, this can indicate that all or substantially all of the adsorbed carbon dioxide has been released, and at step 1080, system 10 stops applying electric current 602 to monolith 212 and unseals first chamber 216. Although method 1000 is described with respect to first chamber 216, it is to be understood that method 1000 can also be performed using second chamber 218. In some embodiments, method 1000 is performed with monolith 212 disposed in second chamber 218 occurs in parallel, simultaneously, or alternating with method 1000 applied to monolith 212 disposed in first chamber 216. For example, in some embodiments, when steps 1010, 1020, and 1030 are applied to monolith 212 disposed in first chamber 216, steps 1050, 1060, and 1070 are applied to monolith 212 disposed in second chamber 218.

Figure 16:
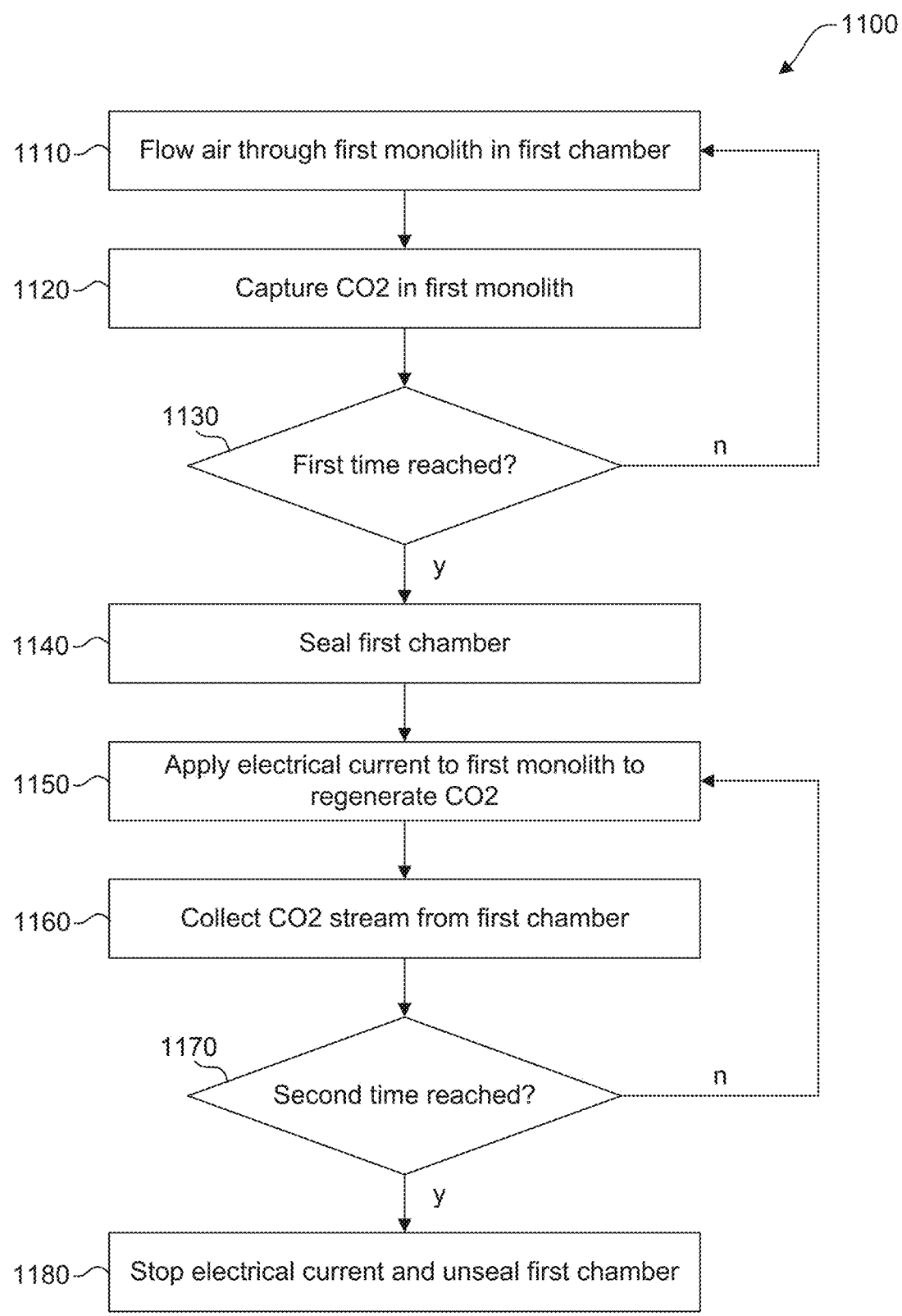
FIG. 16 illustrates a method for extracting carbon dioxide according to some embodiments.
Figure 17:
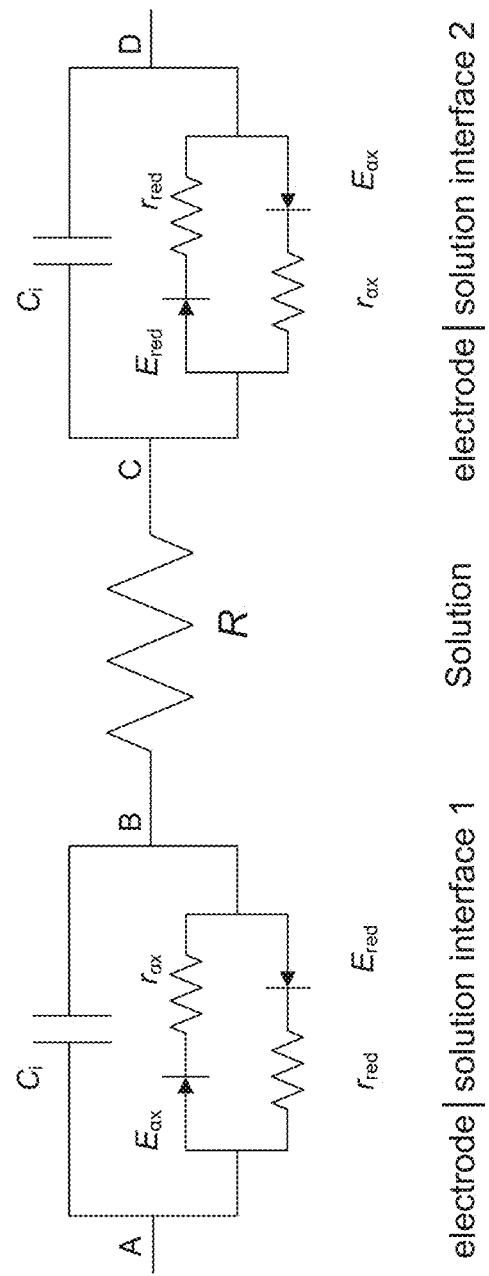
FIG. 17 illustrates a diagram showing electrode-solution interfaces according to some embodiments.

FIG. 16 shows a method 1100 of operating reactor 200 according to some embodiments. In some embodiments, steps 1110 and 1120 are the same as steps 1010 and 1020 in method 1000. In some embodiments, at step 1130, the system determines if a first predetermined time has been reached. In some embodiments, if the predetermined time has been reached, method 1100 repeats steps 1110, 1120, and 1130 until the predetermined time has been reached. In some embodiments, if at step 1130 the system determines that a predetermined time has been reached, method 1100 proceeds to steps 1140, 1150, 1160, which are the same as steps 1040, 1050, 1060, respectively. In some embodiments, the first time is in a range of about 20 minutes to about 70 minutes (e.g., about 30 minutes to about 60 minutes or about 40 minutes to about 50 minutes).

In some embodiments, if the first time is not reached, method 1100 repeats steps 1110, 1120, and 1130 until the first time has been reached. In some embodiments, at step 1170, the system determines if a second predetermined time has been reached. In some embodiments, if the second predetermined time has not been reached, the system repeats steps 1150 and 1160. In some embodiments, if the second predetermined time has been reached, system 10 stops applying electric current 602 to monolith 212 and unseals first chamber 216. Although method 1100 is described with respect to first chamber 216, it is to be understood that method 1100 can also be performed using second chamber 218. In some embodiments, method 1100 is performed with monolith 212 disposed in second chamber 218 occurs in parallel, simultaneously, or alternating with method 1100 applied to monolith 212 disposed in first chamber 216. For example, in some embodiments, when steps 1110, 1120, and 1130 are applied to monolith 212 disposed in first chamber 216, steps 1150, 1160, and 1170 are applied to monolith 212 disposed in second chamber 218.

As used herein, the terms "left" and "right," and "top" and "bottom," and the like are intended to assist in understanding of embodiments of the disclosure with reference to the accompanying drawings with respect to the orientation of monoliths, electrodes, etc. as shown, and are not intended to be limiting to the scope of the disclosure or to limit the disclosure scope to the embodiments depicted in the Figures. The directional terms are used for convenience of description and it is understood that may be positioned in any of various orientations.

As used herein, when the term "about" is used in describing a value or an end-point of a range, the disclosure should be understood to include the specific value or end-point referred to. As used herein, the term "about" may include ±10%.

It is to be appreciated that the Detailed Description section, and not any other section, is intended to be used to interpret the claims. Other sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above examples are illustrative, but not limiting, of the present disclosure. Other suitable modifications and adaptations of the variety of conditions and parameters normally encountered in the field, and which would be apparent to those skilled in the art, are within the spirit and scope of the disclosure.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The breadth and scope of the present disclosure should not be limited by any of the above-described exemplary embodiments, but should be defined only in accordance with the claims and their equivalents.

What is claimed is:

1. A modular system, comprising:
   a plurality of reactors comprising a first reactor and a second reactor, the first reactor being removably coupled to the second reactor,
   wherein the first reactor comprises:
      a first inlet configured to receive a fluid from a fluid source;
      a first monolith comprising a sorbent configured to adsorb carbon dioxide;
      an electric conduit configured to provide an electric current to the first monolith to release carbon dioxide adsorbed by the first monolith;
      a first closure configured to move between an open position and a closed position, wherein the first closure is configured to seal the first inlet in the closed position;
      an outlet configured to remove the fluid from the reactor; and
      a second closure configured to move between an open position to a closed position, wherein the second closure is configured to seal the outlet in the closed position, and
   wherein the second reactor comprises:
      a second inlet configured to receive the fluid from the fluid source;
      a second monolith comprising a sorbent configured to adsorb carbon dioxide;
      an electric conduit configured to provide an electric current to the second monolith to release carbon dioxide adsorbed by the second monolith; and
      a third closure configured to move between an open position to a closed position,
         wherein the third closure is configured to seal the second inlet in the closed position.

2. The modular system of claim 1, wherein the first reactor is stacked on the top of the second reactor.

3. The modular system of claim 1, further comprising a fan configured to direct the fluid through the first inlet of the first reactor and the second inlet of the second reactor.

4. The modular system of claim 3, further comprising a control unit coupled to the first reactor and the second reactor.

5. The modular system of claim 4, further comprising a carbon dioxide purification unit coupled to the first reactor and to the second reactor.

6. The modular system of claim 1, wherein the second reactor further comprises:
   a second outlet configured to remove the fluid from the reactor; and
   a fourth closure configured to move between an open position to a closed position, wherein the fourth closure is configured to seal the second outlet in the closed position.

7. The modular system of claim 6, wherein the first reactor further comprises:
   a first hydraulic cylinder configured to move the first closure of the first reactor between the closed position and the open position.

8. The modular system of claim 7, wherein the first reactor further comprises:
   a first clamp configured to secure the first closure of the first reactor in the closed position; and
   a second clamp configured to secure the second closure of the first reactor in the closed position.

9. The modular system of claim 7, wherein the first hydraulic cylinder is configured to move the first closure of the first reactor between the open position and the closed position based on a difference between the carbon dioxide concentration at the first inlet and the carbon dioxide concentration at the outlet of the first reactor.

10. The modular system of claim 9, wherein the first reactor further comprises further comprises a second hydraulic cylinder configured to move the second closure of the first reactor between the open position and the closed position based on a difference between the carbon dioxide concentration at the first inlet and the carbon dioxide concentration at the outlet of the first reactor.

11. The modular system of claim 10, wherein the first reactor further comprises a first sensor configured to detect the carbon dioxide concentration of the fluid at the outlet of the first reactor.

12. The modular system of claim 11, wherein the first hydraulic cylinder and the second hydraulic cylinder move the first closure of the first reactor and the second closure of the first reactor to the closed position when the carbon dioxide concentration of the fluid at the outlet of the first reactor exceeds a predetermined value.

13. The modular system of claim 12, wherein the predetermined value is in a range of 80 wt % to 95 wt %.

14. The modular system of claim 6, wherein the outlet of the first reactor is coupled to a duct, the duct comprising a fan configured to direct the fluid through the first inlet.

15. The modular system of claim 14, further comprising a second sensor configured to measure volumetric flow rate of the fluid at the first inlet, wherein the first hydraulic cylinder is configured to move the first closure of the first reactor between the open position and the closed position based on the measured volumetric flow rate of the fluid at the first inlet.

16. The modular system of claim 1, wherein the first reactor comprises an array of monoliths, and wherein the first array of monoliths comprises the first monolith.

17. The modular system of claim 1, wherein the first monolith and the second monolith each comprises a metal carbonate.

18. The modular system of claim 17, wherein the metal carbonate compound comprises at least one of potassium carbonate or calcium carbonate.

19. The modular system of claim 1, wherein the electric current has a frequency in a range of about 2 kHz to about 200 kHz.

20. The modular system of claim 19, wherein the electric current is in a range of 0.1 A to 30 A.

21. The modular system of claim 19, wherein the electric current is alternating current.

22. The modular system of claim 19, wherein the electric conduit of the first reactor is configured to provide the electric current to heat the first monolith to a temperature in a range of 120° C. to 180° C.

23. The modular system of claim 19, wherein the electric conduit of the first reactor is configured to provide the electric current to heat the first monolith to a temperature of 150° C. in 30 seconds or less.

24. The modular system of claim 22, wherein the first monolith has a life of 100 cycles to 4000 cycles, wherein each cycle includes heating the first monolith with the electric current and cooling the first monolith to an ambient temperature.

25. The modular system of claim 22, wherein the electric conduit of the first reactor is configured to provide the electric current to the first monolith only when the first closure of the first reactor is in the closed position.

26. The modular system of claim 25, wherein the electric conduit of the first reactor comprises a first electrode coupled to a first surface of the first monolith, and wherein the electric conduit of the first reactor is configured to provide the electric current to the first monolith through the first electrode.

27. The modular system of claim 26, wherein the electric conduit of the first reactor further comprises a second electrode coupled to a second surface of the first monolith, and wherein the first electrode of the first reactor and the second electrode of the first reactor are a pair of bipolar electrodes.

28. The modular system of claim 27, wherein a difference between a pressure of the fluid at the first inlet and a pressure of the fluid at the outlet of the first reactor is in a range of 0.2 inches of water column to 1.1 inches of water column.

29. A modular system, comprising:
 a plurality of reactors comprising a first reactor and a second reactor, the first reactor being removably coupled to the second reactor,
 wherein the first reactor comprises:
  a first inlet configured to receive a fluid from a fluid source;
  a first monolith comprising a sorbent configured to adsorb carbon dioxide, the sorbent comprising a metal carbonate;
  an electric conduit configured to provide an electric current to the first monolith to release carbon dioxide adsorbed by the first monolith;
  a closure configured to move between an open position and a closed position, wherein the closure is configured to seal the first inlet in the closed position, and
 wherein the second reactor comprises:
  a second inlet configured to receive the fluid from the fluid source;
  a second monolith comprising a sorbent configured to adsorb carbon dioxide, the sorbent comprising a metal carbonate;
  an electric conduit configured to provide an electric current to the second monolith to release carbon dioxide adsorbed by the second monolith; and
  a closure configured to move between an open position to a closed position,
  wherein the closure is configured to seal the second inlet in the closed position.

30. The modular system of claim 29, wherein the electric current has a frequency in a range of about 2 kHz to about 200 kHz.

* * * * *